United States Patent [19]

Ogata et al.

[11] Patent Number: 5,777,678

[45] Date of Patent: Jul. 7, 1998

[54] PREDICTIVE SUB-BAND VIDEO CODING AND DECODING USING MOTION COMPENSATION

[75] Inventors: Masami Ogata, Kanagawa; Teruhiko Suzuki, Chiba; Tak Yen Tong, Tokyo, all of Japan

[73] Assignee: Sony Corporation, Tokyo, Japan

[21] Appl. No.: 740,205

[22] Filed: Oct. 24, 1996

[30] Foreign Application Priority Data

Oct. 26, 1995 [JP] Japan ................................. 7-279425

[51] Int. Cl.[6] ........................................... H04N 7/32
[52] U.S. Cl. .......................... 348/398; 348/401; 348/415
[58] Field of Search ............................. 348/398, 397, 348/416, 415, 409, 407, 402, 401, 400, 390, 384; 382/240, 248, 238, 236, 233, 232; H04N 7/133, 7/137

[56] References Cited

U.S. PATENT DOCUMENTS

| | | | |
|---|---|---|---|
| 5,398,067 | 3/1995 | Sakamoto | 348/403 |
| 5,495,292 | 2/1996 | Zhang et al. | 348/407 |
| 5,506,687 | 4/1996 | Gillard et al. | 386/21 |
| 5,537,493 | 7/1996 | Wilkinson | 382/240 |
| 5,592,228 | 1/1997 | Dachiku et al. | 348/416 |

*Primary Examiner*—Bryan Tung
*Attorney, Agent, or Firm*—Frommer Lawrence & Haug LLP; William S. Frommer

[57] ABSTRACT

A method and apparatus for sub-band encoding an input signal in which ringing may be diminished. When performing a number of wavelet transform operations by sub-band encoding, filtering the of signals is done with a small number of taps with increased number of times of spectrum splitting so far made on the signals. That is, filters with a larger number of taps are used for initial-stage frequency spectrum splitting for avoiding step-like patterns from being produced due to deterioration of low-frequency components. With increased number of times of frequency spectrum splitting, filters with a smaller number of taps are used for preventing the relative number of taps from being increased due to downsampling for suppressing picture ringing to a minimum.

15 Claims, 28 Drawing Sheets

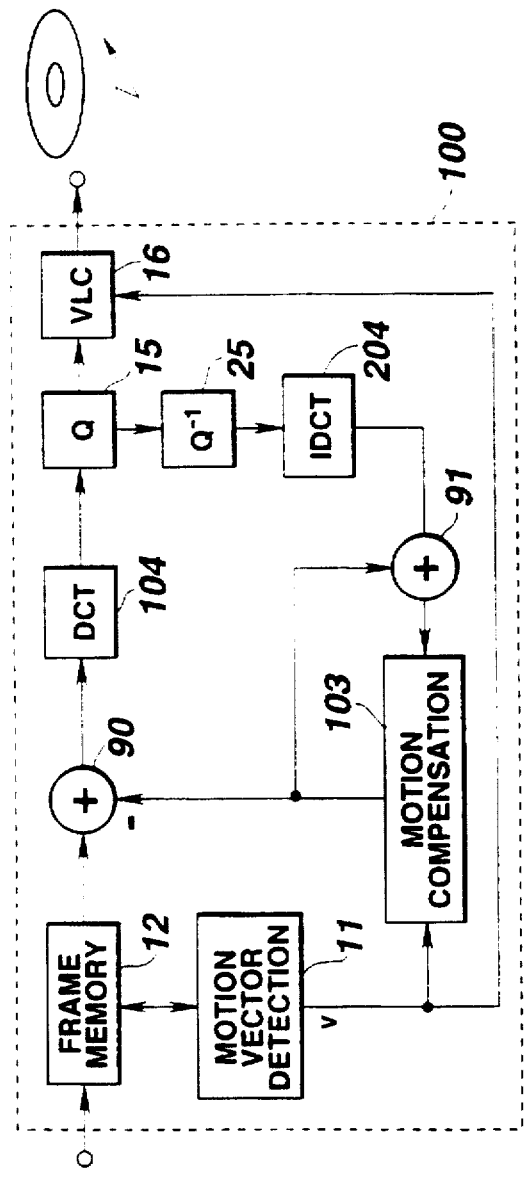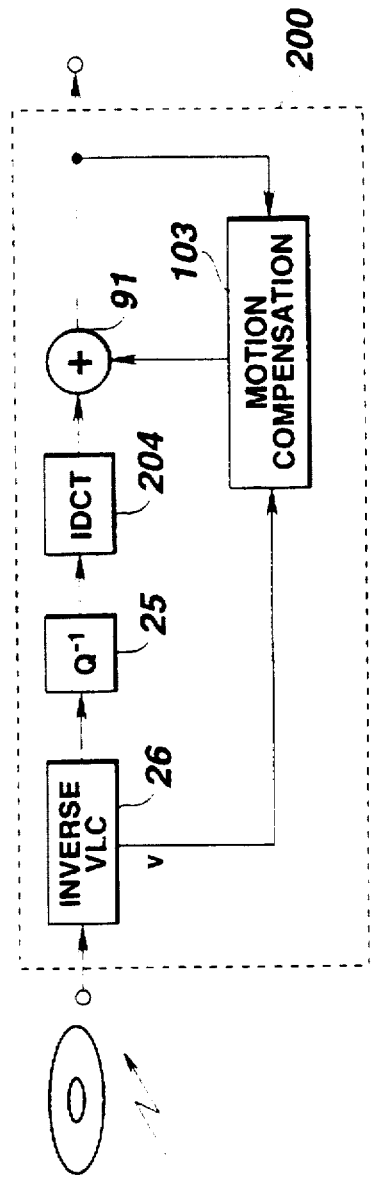
FIG.1A (PRIOR ART)
FIG.1B (PRIOR ART)

| | No. of bits | Mnemonic |
|---|---|---|
| sequence_header() { | | |
|     sequence_header_code | 32 | |
|     bslbf | | |
|     horizontal_size_value | 12 | uimsbf |
|     vertical_size_value | 12 | uimsbf |
|     aspect_ratio_information | 4 | uimsbf |
|     frame_rate_code | 4 | uimsbf |
|     bit_rate_value | 18 | uimsbf |
|     marker_bit | 1 | "1" |
|     vbv_buffer_size_value | 10 | uimsbf |
|     wavelet_layer_number | 4 | uimsbf |
|     wavelet_coefficients() | | ........ |
| | | |
|     load_intra_weighting_matrix | 1 | |
|     if(load_intra_weighting_matrix) | | |
|         intra_weighting_matrix | 8*(wavelet_layer_number*3+1) | uimsbf |
| | 1 | |
|     load_non_intra_weighting_matrix | | |
|     if(load_non_intra_weighting_matrix) | | |
|         non_intra_weighting_matrix[] | 8*(wavelet_layer_number*3+1) | uimsbf |
| | | |
|     next_start_code() | | |
| } | | |

FIG.9

| group_of_pictures_header() { | No. of bits | Mnemonic |
|---|---|---|
| group_start_code | 32 | bslbf |
| time_code | 25 | |
| closed_gop | 1 | |
| broken_link | 1 | |
| next_start_code() | | |
| } | | |

FIG.10

| | No. of bits | Mnemonic |
|---|---|---|
| picture_header() { | | |
|     picture_start_code | 32 | bslbf |
|     temporal_reference | 10 | uimsbf |
|     picture_coding_type | 3 | uimsbf |
|     vbv_delay | 16 | uimsbf |
|     number_of_macroblock | 16 | uimsbf |
|     if(picture_coding_type == 2 II picture_coding_type == 3) { | | |
|         full_pel_forward_vector | 1 | |
|         forward_f_code | 3 | uimsbf |
|     } | | |
|     if(picture_coding_type == 3) { | | |
|         full_pel_backward_vector | 1 | |
|         backward_f_code | 3 | uimsbf |
| | | |
|     next_start_code() | | |
| } | | |

FIG.11

```
macroblock() {                                              No. of bits  Mnemonic
        while(nextbits() == '0000 0001 000')
                macroblock_escape                           11           vlclbf
        macroblock_address_increment                        1-11         vlclbf
        macroblock_type                                     1-9          vlclbf
        macroblock_size                                     2            uimsbf
        if(macroblock_quant)
                quantizer_scale_code                        5            uimsbf
        if((macroblock_motion_forward_ II coding_uknit_motion_backward) &&
                macroblock_size == 16)
                mc_mode                                     1
        if(macroblock_motion_forward)
                motion_vectors(0)                                        . . . .
        if(macroblock_motion_backward)
                motion_vectors(1)                                        . . . .

if(macroblock_intra && picture_coding_type ! = 1) {
                for(i = 0; i< 6; i++) {
                        if(i < 4) {
                                intra_dc_size_luminance     2-9          vlclbf
                                if(intra_dc_size_luminance ! = 0)
                                        intra_dc_differential  1-11      uimsbf
                        } else {
                                intra_dc_size_chrominance   2-9          vlclbf
                                if'intra_dc_size_luminance ! = 0)
                                        intra_dc_differential  1-11      uimsbf
                        }
                }
        }
        wavelet_coefficients()
}
```

FIG.12

```
motion_vectors(s) {
        for(i = 0; i <number_of_motion_vectors; i++)
        motion_vector(s)
}
```

FIG.13A

| motion_vectors(s) { | No. of bits | Mnemonic |
|---|---|---|
| motion_horizontal_code | 1-11 | vlclbf |
| if((horizontal_f! = 1) && (motion_horizontal_code != 0)) | | |
| motion_horizontal_r | 1-8 | uimsbf |
| if(dmv == 1 ) | | |
| dmv_horizontal | 1-2 | vlclbf |
| motion_vertical_code | 1-11 | vlclbf |
| if((vertical_f != 1) && (motion_vertical_code !=0)) | | |
| motion_vertical_r | 1-8 | uimsbf |
| if(dmv == 1) | | |
| dmv_vertical | 1-8 | vlclbf |
| } | | |

FIG.13B

```
wavelet_coefficients( ) {                              No. of bits   Mnemonic
    for(i = 0; i < wavelet_layer_number; i++)
        wavelet_coeff_index                                 8          uimsbf
}
```

FIG.14A

```
wavelet_coefficients( ) {                              No. of bits   Mnemonic
    for(i = 0; i < wavelet_layer_number; i++) {
        lowpass_tap_number                                  8          uimsbf
        wavelet_coefficient[]                    8*lowpass_tap_number
                                                                       uimsbf
        highpass_tap_number                                 8          uimsbf
        wavelet_coefficient[]                   8*highpass_tap_number
                                                                       uimsbf
    }
}
```

FIG.14B

| | No. of bits | Mnemonic |
|---|---|---|
| wavelet_band_header() { | | |
|    band_start_code | 32 | bslbf |
|    band_id | 6 | uimsbf |
|    next_start_code() | | |
| } | | |

FIG.19

```
macroblock() {                                                  No. of bits  Mnemonic
        while(nextbits() == '0000 0001 000')
                macroblock_escape                                     11      vlclbf
        macroblock_address_increment                                 1-11     vlclbf
        macroblock_type                                              1-9      vlclbf
        macroblock_size                                                2      uimsbf
        if(macroblock_quant)
                quantizer_scale_code                                   5      uimsbf
        if((macroblock_motion_forward_ II coding_uknit_motion_backward) &&
                macroblock_size == 16)
                mc_mode                                                1
        if(macroblock_motion_forward)
                motion_vectors(0)                                             . . . .
        if(macroblock_motion_backward)
                motion_vectors(1)                                             . . . .

if(macroblock_intra && picture_coding_type ! = 1) {
                for(i = 0; i< 6; i++) {
                        if(i < 4) {
                                intra_dc_size_luminance               2-9      vlclbf
                                if(intra_dc_size_luminance ! = 0)
                                        intra_dc_differential        1-11     uimsbf
                        } else {
                                intra_dc_size_chrominance             2-9      vlclbf
                                if'intra_dc_size_luminance ! = 0)
                                        intra_dc_differential        1-11     uimsbf
                        }
                }
        }
}
```

FIG.20

| | No. of bits | Mnemonic |
|---|---|---|
| tree_header() { | | |
| tree_start_code | 32 | bslbf |
| tree_Id | 2 | |
| next_start_code() | | |
| } | | |

FIG.23

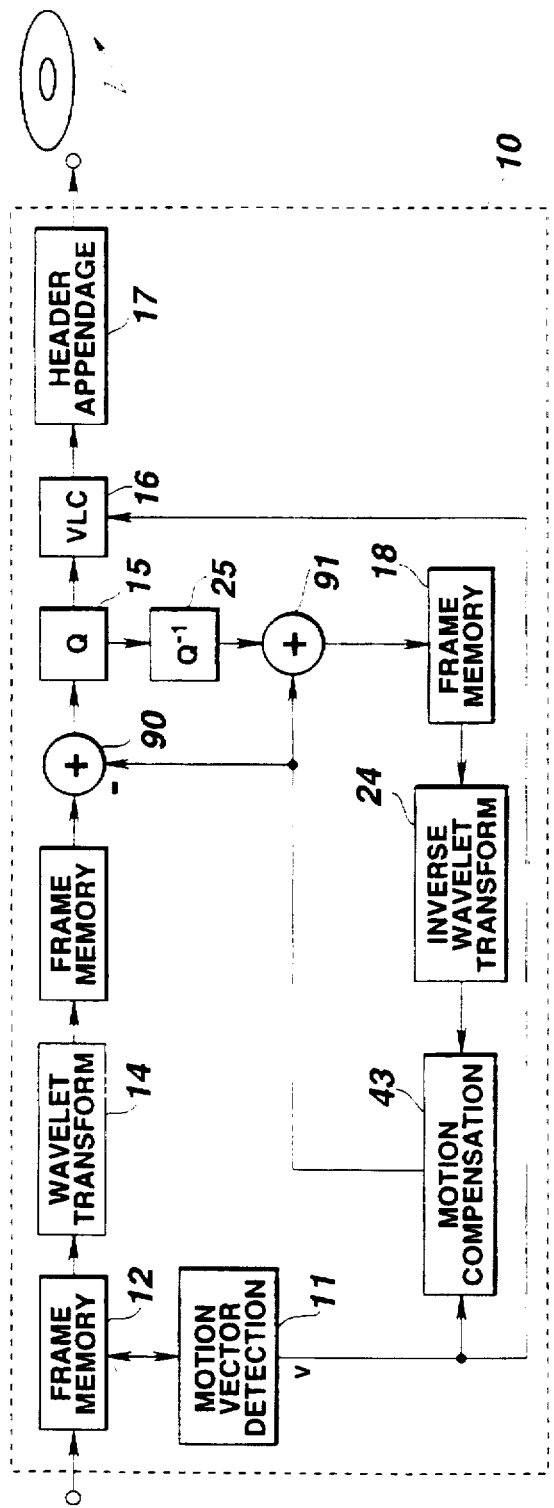
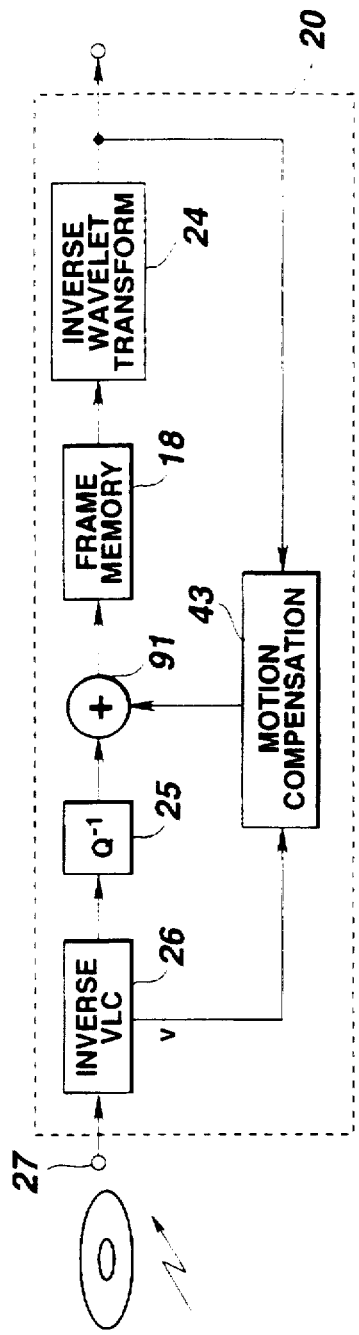
FIG.26A
FIG.26B

# PREDICTIVE SUB-BAND VIDEO CODING AND DECODING USING MOTION COMPENSATION

BACKGROUND OF THE INVENTION

1. Field of the Invention

This invention relates to and decoding picture encoding method and apparatus, a picture transmitting method and a recording medium. More particularly, it relates to method and apparatus for encoding and decoding picture signals directed to moving picture compression, a recording medium, such as a video tape, video disc or a semiconductor memory, AV equipment provided with the encoding or decoding apparatus, a transmission system in a communication equipment, such as television broadcasting or a teleconferencing system, and a method and apparatus for encoding/decoding picture signals for such communication equipment.

2. Description of Related Art

Among encoding and decoding methods aimed at compressing digital signals, there is a method based on spectrum splitting (dividing) by a filter for sub-band encoding or a filter for wavelet transform. This method resides in passing an input signal through plural filters of different passbands, sub-sampling the signals at intervals matched to the respective bandwidths and compressing the signal by exploiting energy deviation in the output signals of the respective filters.

A discussion of signal processing by spectrum splitting using the sub-band encoding and wavelet transform may be found in Martin Vetterli, "Wavelet transform and Sub-band Coding", Journal of Society of Electronic Information Communication, vol.74, No.12, pp. 1275 to 1278, December 1991.

Referring to FIGS. 1A and 1B, a prior-art example of a picture encoding apparatus (encoder) and a picture decoding apparatus (decoder) employing motion compensation and DCT is explained. FIGS.1A and 1B show a picture encoder and a picture decoder, respectively.

In the picture encoder 100, an input picture is supplied via an input terminal to a frame memory 12. A motion vector detector 11 detects a motion vector v from the input picture stored in the frame memory 12. As a motion vector detection method, block matching based on a 16×16 pixel block is usually employed. Also, matching based on a half-pixel is used for realizing higher accuracy. In place of block matching, other known motion vector detection methods may also be used.

A motion compensator 103 has a frame memory, not shown, and predicts pixel values at respective positions of a picture for encoding from the picture already encoded, then decoded and stored in the frame memory. A predicted value $I[i, j, t]$ of a pixel value $I[i, j, t]$ at a position (i, j) of a picture entered at time t is determined by the equation (1):

$$I(i,j,t) = (I[i',j',t-T] + I[i'+1,j',t-T] + I[i',j'+1,t-T] + I[i'+1,j'+1,t-T])/4 \quad (1)$$

$$i' = int(i + vx(i,j,t)T)$$
$$j' = int(j + vy(i,j,t)T)$$

using a motion vector $v=(vx (i, j, t), vy(i, j, t))$ corresponding to this position.

In the above equation, T is a difference between time at which a picture I currently predicted is entered and a time at which a picture in the frame memory is entered. The terms ($I[i', j', t-T]$, $I[i'+1, j', t-T]$, $I[i', j'+1, t-T]$ and $I[i'+1, j'+1, t-T]$) on the right side of the equation 1 represent pixel values in the frame memory, not shown. Also, int(x) represents a maximum integer value not exceeding x.

The frame memory 12 sends the input picture to a subtractor 90. The subtractor 90 calculates the difference between the value of the pixel to be now encoded and the predicted value calculated by the motion compensator 103.

The difference value from the subtractor 90 is supplied to a discrete cosine transform (DCT) unit 104. The DCT unit 104 performs two-dimensional DCT on a 8×8 block made up of differential values.

The DCT coefficient c from the DCT unit 104 is supplied to a quantizer unit 15 which then quantizes DCT coefficients c obtained by the DCT unit 104 in accordance with the equation 2:

$$c'=int(c/Q+0.5) \quad (2)$$

using an appropriate step size Q.

The quantized DCT coefficients are supplied to a variable length encoding unit 16 and to a dequantizer 25. The dequantizer 25 executes dequantization in accordance with the equation (3):

$$c''=c'Q \quad (3)$$

using the step size which is the same as that used in the quantizer 15.

The dequantized data is dequantized by an IDCT unit 204 for restoring the difference of the pixel value. This difference is summed by an adder 91 to a prediction value outputted by the motion compensator 103 to form pixel value data which is sent to the motion compensator 103 for storage in a frame memory, not shown.

The variable length encoder 16 variable length encodes the quantized DCT coefficients obtained by the quantizer 15 and the motion vector v obtained by the motion vector detector 11 to output a bitstream.

On the other hand, the picture decoder 200 performs processing which is the reverse of the processing performed by the variable length encoding unit 16 of the encoder 100, on the bitstream supplied via an input terminal, by an inverse variable length encoding unit 26, for restoring the quantized DCT coefficients and the motion vector v from the bitstream. The DCT coefficients, thus produced, are supplied to the dequantizer 25, while the motion vector v is supplied to the motion compensator 103.

The dequantizer 25 and the IDCT unit 204 are the same as those of the picture encoder 100 and execute the dequantization of the equation (3) and IDCT, respectively, for restoring the difference values of the pixel values. These difference values are summed by the adder 91 to the prediction value already generated by the motion compensator 103 to form pixel value data for reconstructing a picture corresponding to the input picture for the picture encoder 100. The pixel values of the decoded picture are stored in the frame memory, not shown, provided in the motion compensator, for generating the predicted picture.

The motion compensator 103 is the same as that provided in the encoder 100 and predicts respective pixel values of the picture now to be decoded using the motion vector v obtained by the inverse variable length encoding unit 26 and the picture stored in a frame memory provided in the motion compensator 103 for generating a prediction picture.

The above-described operation is performed for a so-called inter-frame prediction picture, such as the P- or B-picture in MPEG1 or MPEG2. Thus, for an intra-frame picture, difference calculations by the difference unit 90 are not executed, but pixel data from the frame memory is directly supplied to the DCT unit 104 for executing subsequent operations.

The method of transmitting the bitstream in the conventional encoding system such as MPEG1 is briefly explained. In MPEG1, the minimum unit header having a sync code is a slice header. Thus, if errors are produced such that part of data becomes undecodable, decoding is done from the next slice header.

In the encoding employing block-based motion detection and motion compensation, there is produced difference in the properties of the predicted errors in neighboring blocks present in a discontinuous motion region thus incurring edge-shaped deterioration along block boundaries. In the conventional method, since motion compensation is performed on the picture, such deterioration in the block boundaries presents itself directly on the decoded picture thus deteriorating the picture quality.

In addition, in the above-described bitstream transmitting method, if errors are incurred in a portion of data, all data are lost on the slice basis. In short, picture quality deterioration is fatal in this case because all data of the undecodable slice region is lost.

SUMMARY OF THE INVENTION

It is therefore an object of the present invention to provide encoding and decoding method and apparatus, a picture transmitting method and a recording medium having encoded data recorded thereon.

It is another object of the present invention to provide a picture transmitting method in which fatal deterioration of the decoded picture can be avoided even if data of a given band is lost.

In one aspect, the present invention provides a picture encoding apparatus for encoding picture signals using a filter for sub-band encoding. The encoding apparatus includes motion vector detection means for detecting a motion vector from an input picture signal, sub-band transform means for spectrum splitting of the input picture signal by sub-band transform for generating sub-band coefficients, encoding means for encoding the difference of the sub-band coefficients for generating an encoded signal, decoding means for decoding the encoded signal for generating a difference of decoded sub-band coefficients, motion compensation means for generating prediction sub-band coefficients for predicting the sub-band coefficient from the motion vector and a picture already restored, addition means for summing the prediction sub-band coefficients to the difference of the decoded sub-band coefficients for generating decoded sub-band coefficients, inverse sub-band transform means for inverse sub-band transforming the restored sub-band coefficients for restoring a picture, and coefficient difference calculating means for calculating the difference between the sub-band coefficients and the prediction sub-band coefficients.

In another aspect, the present invention provides a picture decoding apparatus for decoding a picture signal using a filter for sub-band transform, including receiving means for receiving a picture signal containing at least a motion vector and a difference value of the encoded sub-band coefficient, separation means for separating the motion vector from the encoded difference of the sub-band coefficients, decoding means for decoding the encoded difference value of the sub-band coefficients for generating decoded difference value of the sub-band coefficients, motion compensation means for generating prediction sub-band coefficients for predicting sub-band coefficients from the motion vector and the restored picture, coefficient addition means for summing the decoded difference value of the sub-band coefficients to the prediction wavelet coefficients obtained by the motion compensation means, and inverse sub-band transform means for inverse sub-band transforming the sub-band coefficients from the coefficient addition means for restoring a picture.

In still another aspect, the present invention provides a picture encoding method for encoding picture signals using a filter for sub-band encoding including a motion vector detection step for detecting a motion vector from an input picture signal, a sub-band transforming step for spectrum splitting of the input picture signal by sub-band transform for generating sub-band coefficients, an encoding step for encoding the difference of the sub-band coefficients for generating an encoded signal, a decoding step for decoding the encoded signal for generating a difference of decoded sub-band coefficients, a motion compensation step for generating prediction sub-band coefficients for predicting the sub-band coefficient from the motion vector and a picture already restored, an addition step for summing the prediction sub-band coefficients to the difference of the decoded sub-band coefficients for generating decoded sub-band coefficients, an inverse sub-band transforming step for inverse sub-band transforming the restored sub-band coefficients for restoring a picture, and a coefficient difference calculating step for calculating the difference between the sub-band coefficients and the prediction sub-band coefficients.

In still another aspect, the present invention provides a picture decoding method for decoding a picture signal using a filter for sub-band transform, including a receiving step for receiving a picture signal containing at least a motion vector and a difference value of the encoded sub-band coefficient, a separation step for separating the motion vector from the encoded difference of the sub-band coefficients, a step for decoding the encoded difference value of the sub-band coefficients for generating a decoded difference value of the sub-band coefficients, a step for generating prediction sub-band coefficients for predicting sub-band coefficients from the motion vector and the restored picture, a step for summing the decoded difference value of the sub-band coefficients to the generated prediction sub-band coefficients, and an inverse sub-band transform step for inverse sub-band transforming the sub-band coefficients from the summing step for restoring a picture.

In still another aspect, the present invention provides a picture transmitting method for transmitting a picture signal using a filter for sub-band transform, including detecting a motion vector from an input picture signal, spectrum splitting the input picture signal by sub-band transform for generating sub-band coefficients, encoding the difference of the sub-band coefficients for generating an encoded signal, decoding the encoded signal for generating a difference of decoded sub-band coefficients, generating prediction sub-band coefficients for predicting the sub-band coefficient from the motion vector and a picture already restored, summing the prediction sub-band coefficients to the difference of the decoded sub-band coefficients for generating decoded sub-band coefficients, inverse sub-band transforming the restored sub-band coefficients for restoring a picture, calculating the difference between the sub-band coefficients and the prediction sub-band coefficients, and transmitting a bitstream made up of the motion vector and the difference sub-band coefficients.

In yet another aspect, the present invention provides a recording medium capable of being decoded by a decoding apparatus wherein the recording medium has recording signals capable of being decoded by the decoding apparatus. The recording signals include a motion vector detected from an input picture signal, and a differential sub-band coefficient between a sub-band coefficient obtained on frequency spectrum splitting an input picture signal by sub-band transform and a prediction sub-band coefficient. The prediction sub-band coefficient is generated from the motion vector and a picture already restored. The restored picture is obtained by inverse sub-band transforming restored sub-band coefficients. The restored sub-band coefficients are obtained by adding the prediction coefficient to the decoded difference of the sub-band coefficients generated by decoding encoded signals obtained in turn on encoding the difference of the sub-band coefficients.

BRIEF DESCRIPTION OF THE DRAWINGS

FIGS. 1A and 1B are block diagrams showing the structure of a conventional picture encoder and a conventional picture decoder.

FIG. 9 illustrates the format of a sequence header of a bitstream.

FIG. 10 illustrates the format of a GOP header of a bitstream.

FIG. 11 illustrates the format of a picture header of a bitstream.

FIG. 12 shows the format of a macro-block header of a bitstream.

FIGS. 13A and 13B illustrate the format of a motion vector header of a bitstream.

FIGS. 14A and 14B illustrate coefficients for inverse wavelet transform.

FIG. 19 shows a format of a format of a band header in the second transmitting method of the present invention.

FIG. 20 shows a format of a macro-header in the second transmitting method of the present invention.

FIG. 23 illustrates the format of a tree header in the third transmitting method according to a third transmitting method according to the present invention.

FIGS. 26A and 26B are block diagrams showing the structures of a picture encoder and a picture decoder according to a third embodiment of the present invention.

DESCRIPTION OF THE PREFERRED EMBODIMENTS

Figures 2A, 2B:
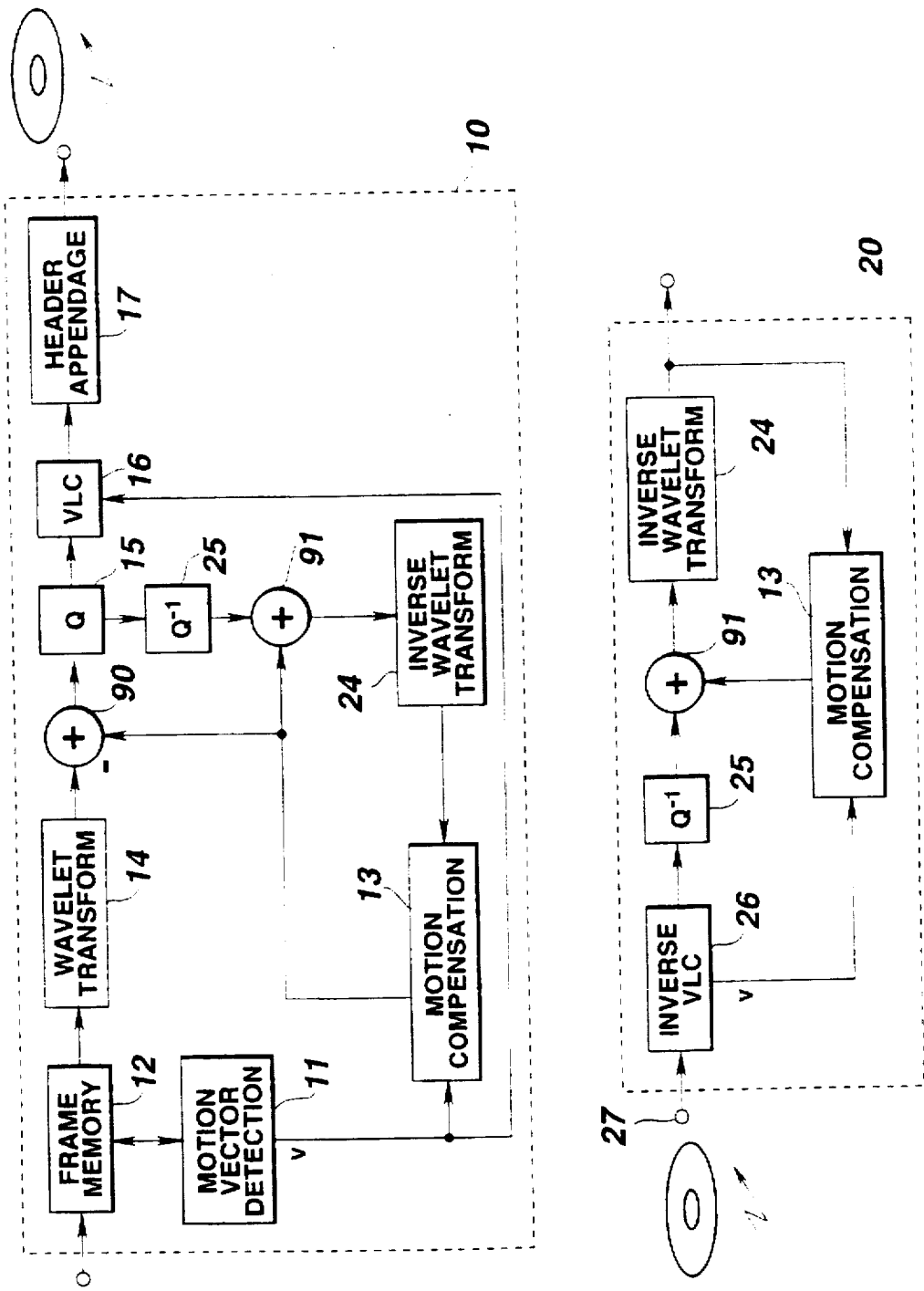
FIGS. 2A and 2B are block diagrams showing the structure of a picture encoder and a picture decoder according to a first embodiment of the present invention.

Referring to the drawings, preferred embodiments of the present invention will be explained in detail.

Figure 3:
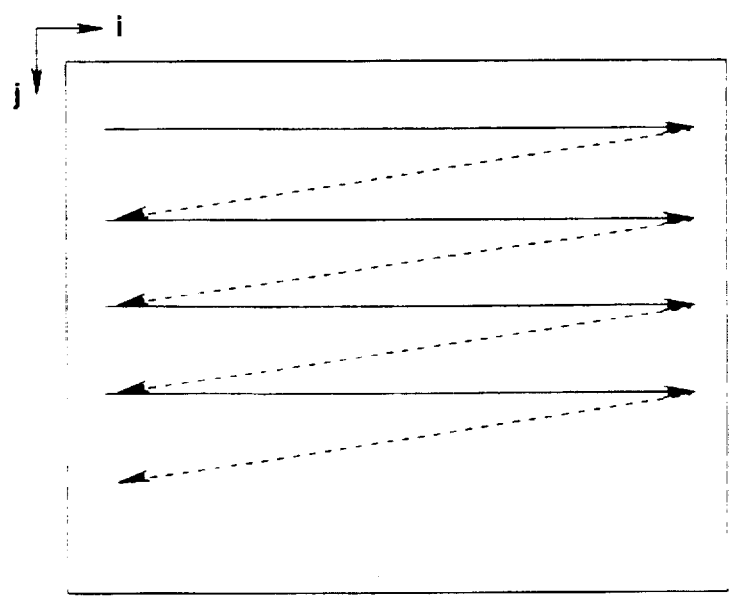
FIG. 3 is a diagrammatic view for illustrating the picture scanning direction.

FIGS. 2A and 2B illustrate a picture encoder and a picture decoder employing wavelet transform according to a first embodiment of the present invention. The parts or components having the same function as those of the conventional example are denoted by the same numerals and are not explained for brevity. The pixels values of a picture I are denoted as I[i, j] and are entered by being scanned in a sequence shown in FIG. 3. In the pixel value, i and j denote coordinates in the horizontal and vertical directions, respectively.

In a picture encoder 10, an input picture is supplied via an input terminal to a frame memory 12. The input picture supplied to the frame memory 12 is supplied to a wavelet transform unit 14. The wavelet transform unit 14 performs the frequency spectrum splitting on the input picture, and hence is equivalent to a conventional DCT unit. In the conventional example, the DCT unit is arranged downstream of a subtractor 90 for performing motion compensation on all picture. In the present invention, the wavelet transform unit 14 is arranged ahead of the subtractor 90 for performing motion compensation on the wavelet coefficients resulting from wavelet transform. The wavelet transform unit 14 executes wavelet transform in terms of a full picture as a unit.

That is, an input picture is supplied to the frame memory 12 of the picture encoder 10. A motion vector detector 11 detects a motion vector v from an input picture stored in the frame memory 12. As a method for detecting the motion vector, block matching in terms of a 16×16 pixel block as a unit is usually employed. For realizing higher accuracy, half-pel based matching is employed. In place of block matching, other known motion vector detection methods may also be employed.

An input picture from the frame memory 12 is supplied to the wavelet transform unit 14. The wavelet coefficients from the wavelet transform unit 14 are supplied to the subtractor 90. The subtractor 90 subtracts the predicted wavelet coefficients from the prediction wavelet coefficient from a motion compensator 13 as later explained for outputting differential wavelet coefficients.

The differential wavelet coefficient from the subtractor 90 is supplied to a quantizer 15 which then executes quantization as specified by the equation (2) using the same step size as that used by the quantizer 15.

The quantized differential wavelet coefficients are supplied to a variable length encoder 16 and a dequantizer 25 which then dequantizes the coefficients supplied thereto in accordance with the equation (3) using the same step size as that used in the quantizer 15.

The dequantized data is supplied to an adder 91 so as to be summed to the predicted wavelet coefficients supplied to the adder 91 from the motion compensator 13 as later explained. The resulting sum value is supplied to an inverse transform unit 24.

The inverse transform unit 24, corresponding to an IDCT unit in the conventional example, is arranged downstream of the adder 91 for the same reason as that described above. The restored picture, resulting from the inverse wavelet transform, is supplied to the motion compensator 13 so as to be stored in a frame memory, not shown, provided in the motion compensator 13.

The motion compensator 13 predicts the wavelet coefficients to be now encoded from the motion vector sent from the motion vector unit 11 and the restored picture stored in the frame memory, not shown. The wavelet coefficient predicted by the motion compensator 13 is sent as predicted wavelet coefficient to the subtractor 90 where the difference between it and the wavelet coefficient now to be encoded is computed. The predicted wavelet coefficient is sent to the adder 91 for restoring the wavelet coefficient.

The variable length encoder 16 variable length encodes the differential wavelet coefficient, quantized by the quantizer 15, and the motion vector obtained by the motion vector detector 11, for outputting a variable length encoded signal to a header appendage unit 17. The header appendage unit 17 appends each header as later explained to the supplied signal and outputs a resulting bitstream. This bitstream is supplied to a recording device for recording on a video disc, such as an optical disc, magnetic disc or a magneto-optical disc, a video tape or a semiconductor memory. Alternatively, the bitstream is supplied to a transmission device, not shown, for transmission over a transmission channel.

In a picture decoder 20, the bitstream reproduced from the video disc, such as an optical disc, magnetic disc or a magneto-optical disc, a video tape or a semiconductor memory, by a reproducing device, not shown, is supplied to an input terminal 27. Alternatively, the bitstream transmitted over the transmission channel is received by receiving device and supplied to a reception terminal 27. The received bitstream is supplied to a variable length encoding unit 26. The variable length encoding unit 26 separates the headers appended in the encoder 10 and performs an operation reversed from the operation of the variable length encoding unit 26 of the encoder 10 for restoring the quantized differential wavelet coefficients and the motion vector from the bitstream. The resulting quantized differential wavelet transform coefficients are supplied to a dequantizer 25 and the adder 91 in this order, while the motion vector v is supplied to the motion compensator 13.

The dequantizer 25 and the adder 91 have the same function as that of the similar components of the encoder 10 and the differential wavelet transform coefficients. In the dequantizer, the differential wavelet coefficients are dequantized in accordance with the equation 3 and the resulting signal is supplied to the adder 91 and summed to the predicted wavelet coefficients from the motion compensator for restoring the wavelet coefficients. The restored wavelet coefficients are supplied to the inverse wavelet transform unit 24 which then restores a picture corresponding to an input picture to the picture encoder 10 and outputs the restored picture. The pixel values of the decoded picture are stored in a frame memory, not shown, provided in the motion compensator 13, for generating the predicted picture. The inverse wavelet transform unit 24 has the same function as that provided in the picture encoder 10.

The motion compensator 13 has the same function as that of the picture encoder 10 and generates predicted wavelet coefficients, using the motion vector v obtained by the variable length encoder 26 and the picture stored in the frame memory, not shown, provided in the motion compensator 13, and transmits the generated coefficients to the adder 91. The adder 91 sums the differential wavelet coefficients to the predicted wavelet coefficients.

Figure 4:
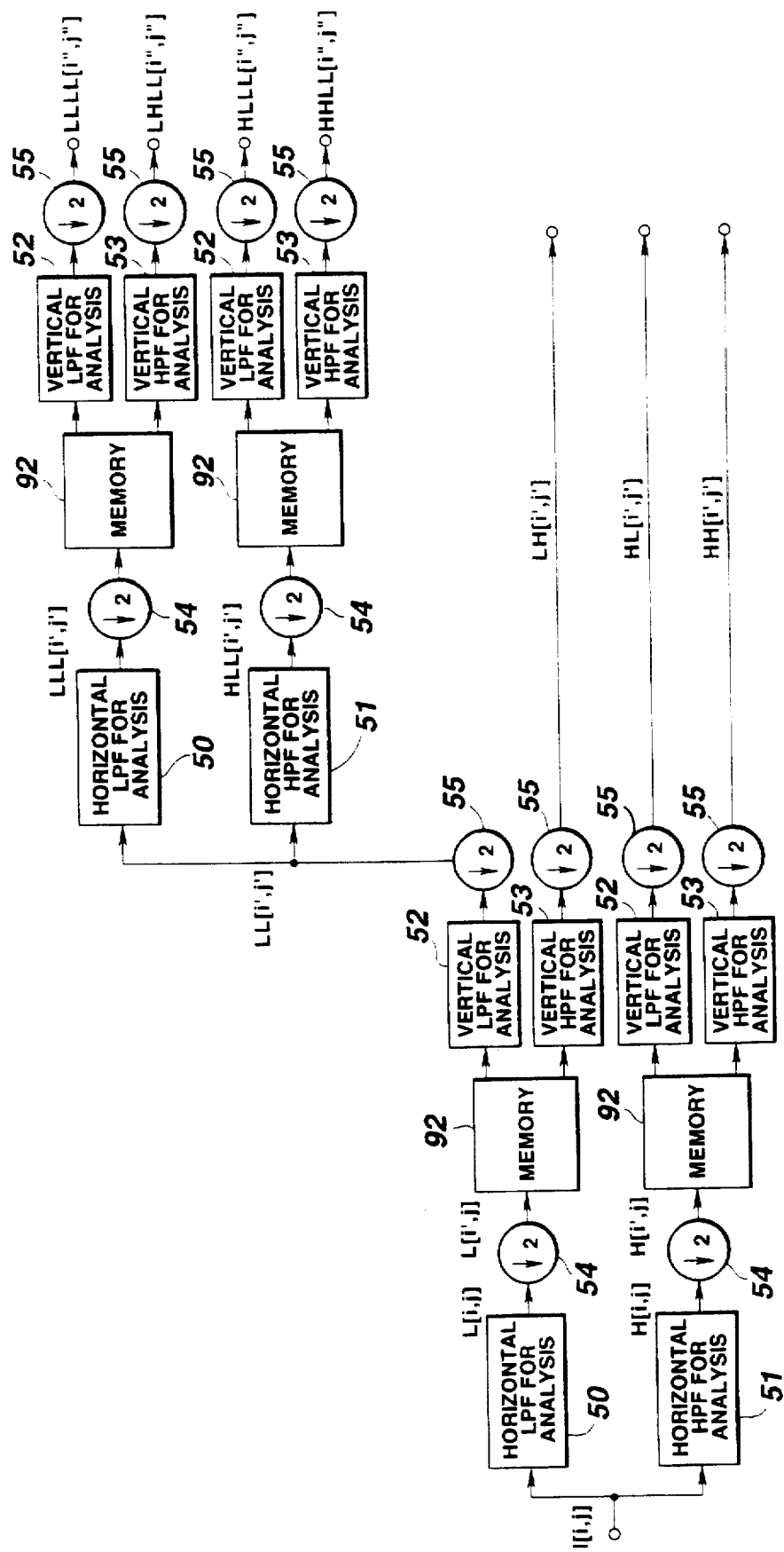
FIG. 4 is a block diagram showing the structure of a wavelet transform unit.

FIG. 4 shows the structure of the wavelet transform unit 14. The wavelet transform unit 14 shows the two-stage band splitting for splitting the frequency spectrum into 7 bands. First, the input picture data I[i,j] is supplied to a horizontal low-pass filter for analysis 50 and a horizontal high-pass filter for analysis 51 for horizontal frequency splitting in the horizontal direction on the picture. These filters may each be a linear filter having coefficients as shown for example in table 1:

TABLE 1

| tap number | coefficients |
| --- | --- |
| (for low-pass filter) | |
| [0] | 0.046875 |
| [1] | −0.093750 |
| [2] | −0.250000 |
| [3] | 0.593750 |
| [4] | 1.406250 |
| [5] | 0.593750 |
| [6] | −0.250000 |
| [7] | −0.093750 |
| [8] | 0.046875 |
| (for high-pass filter) | |
| [0] | 0.500000 |
| [1] | −1.000000 |
| [2] | 0.500000 |

Meanwhile, a filter for analysis and a filter for synthesis used for wavelet splitting/synthesis are constructed for completely or approximately satisfying the relation according to the equations (4) and (5):

$$H_0(-z)F_0(z)+H_1(-z)F_1(z)=0 \quad (4)$$

$$H_0(z), H_1(z), F_0(z) \text{ and } F_1 = 2z^{-L} \quad (5)$$

In the above equations, H0(z), H1(z), F0(z) and F1(z) are transfer functions of a low-pass filter for analysis, a high-pass filter for analysis, a low-pass filter for synthesis and a high-pass filter for synthesis, respectively, while L is an arbitrary integer. The signal generated under this constant condition is assured to completely or approximately coincide with the input signal prior to spectrum splitting. As coefficients of a synthesis filter corresponding to the filter shown in Table 1, the filter coefficients shown in the following Table 2 are used.

TABLE 2

| tap number | coefficients |
|---|---|
| (for low-pass filter) | |
| [0] | 0.250000 |
| [1] | 0.500000 |
| [2] | 0.250000 |
| [0] | −0.023438 |
| [1] | −0.046875 |
| [2] | 0.125000 |
| [3] | 0.296875 |
| [4] | −0.703125 |
| [5] | 0.296875 |
| [6] | 0.125000 |
| [7] | −0.046875 |
| [8] | −0.023438 |

The horizontal low-range signal L[i,j] and the horizontal high-range signal H[i,j], obtained by the respective filters, are supplied to associated horizontal sub-sampling units 54 and thereby decimated from sample to sample in accordance with the following equation (6):

$$X[i',j] = X[i,j], i' = i/2 \quad (6)$$

$$X = L \text{ or } H$$

Each of the memories 92 is a storage unit made up of plural line memories for securing data required in a vertical low-pass filter for analysis 52 or a vertical high-pass filter for analysis 53, and includes a number of line memories equal to the number of taps of the filter used for vertical filtering. For example, if the filter shown in Table 1 is used, nine line memories are installed for matching to the low-pass filter having a large number of taps.

In the vertical low-pass filter for analysis 52 and the vertical high-pass filter for analysis 53, data stored in the memories 92 are filtered by low-pass filtering and high-pass filtering in the vertical direction of the picture for frequency splitting in the vertical direction. An output signal LL[i', j] of the vertical low-pass filter for analysis 52 and an output signal LH[i', j] of the vertical low-pass filter for analysis 53, for the horizontal low-range signal L[i', j], and an output signal HL[i', j] of the vertical low-pass filter for analysis 52 and an output signal HH[i', j] of the vertical high-pass filter for analysis 53, for the horizontal high-range signal H[i', j], are supplied to associated vertical sub-sampling units 55 where sub-sampling in the vertical direction of the picture, that is line-based decimation, is carried out in accordance with the equation (7):

$$X[i',j'] = X[i',j], j' = j/2 \quad (7)$$

$$X = LL, LH, HL \text{ or } HH$$

The respective frequency range signals LH[i', j'], HL[i', j'] and HH[i', j'] from the vertical sub-sampling are directly outputted from the wavelet transform unit. On the other hand, the signal LL[i', j'] from horizontal and vertical low-pass filtering is supplied as input to the horizontal low-pass filter for analysis 50 and a horizontal high-pass filter for analysis 51 of the second stage where the same processing as the first-stage spectrum splitting is carried out for generating further band-split signals LLLL[i", j"], LHLL[i", j"], HLLL[i", j"] and HHLL[i", j"].

The output signals LLLL[i", j"], LHLL[i", j"], HLLL[i", j"] and HHLL[i", j"] and the output signals LH[i', j'], HL[i', j'] and HH[i', j'] of the wavelet transform unit become wavelet coefficients for respective frequency bands.

Although not shown, the operation for third and following stages of the frequency spectrum splitting is carried out on the output signal LLLL in the same way as for the second-stage processing.

Figure 5:
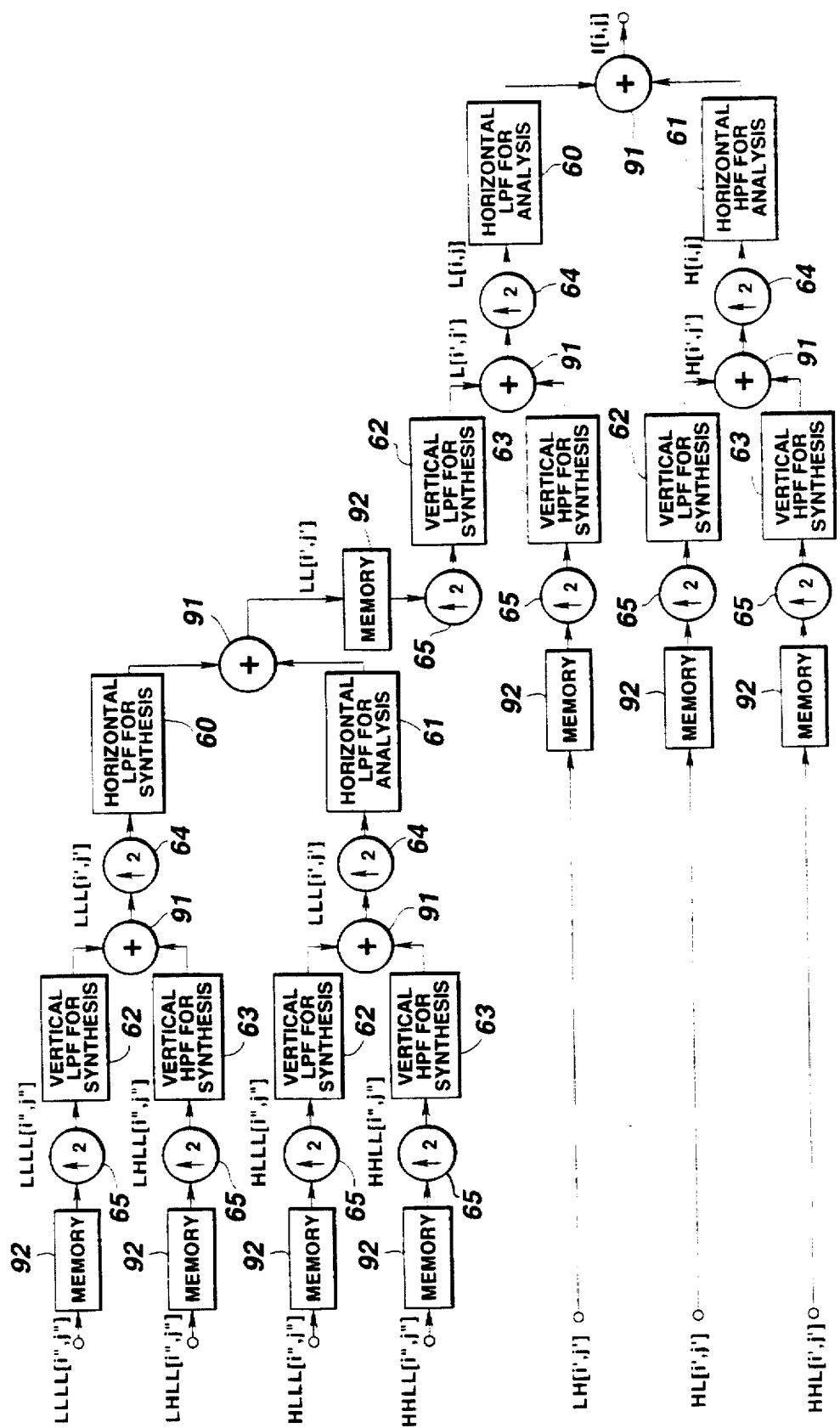
FIG. 5 is a block diagram showing the structure of an inverse wavelet transform unit.

FIG. 5 shows the structure of the inverse wavelet transform unit 24, where the respective band signals LLLL[i", j"], LHLL[i", j"], HLLL[i", j"] and HHLL[i", j"] and LH[i', j'], HL[i', j'] and HH[i', j'] from the wavelet transform unit 14 shown in FIG. 2 are sequentially synthesized for restoring the picture.

The eight band signals are received and, of these, the signals LLLL[i", j"], LHLL[i", j"], HLLL[i", j"] and HHLL[i", j"], processed with two-stage frequency spectrum splitting, are first synthesized. These signals are first stored in a memory made up of plural line memories 92 for storing data having the number of lines equal to the number required in a downstream side vertical low-pass filter 62 or vertical high-pass filter 63. The number of lines required is equal to (the number of taps +1)/2 or (the number of taps)/2 if the number of taps of the vertical filter is odd or even, respectively. If the low-pass filter shown in Table 2 is used, two line memories are provided ahead of the vertical synthesis low-pass filter 62. The number of line memories required in the memory 92 differs from that on the encoder side because up-sampling processing in the vertical direction is performed between the memories 92 and filtering processing.

The signals LLLL[i", j"], LHLL[i", j"], HLLL[i", j"] and HHLL[i", j"] from the memories 92 are supplied to vertical up-sampling sampling units 65 where the operation of inserting all-zero 1-line data between respective input lines as shown by the equation (8)

$$X[i'',j'] = \begin{cases} X[i'',j''] \ldots j' = 2 \times j'' \\ 0 \ldots j' = 2 \times j'' + 1 \end{cases} \quad (8)$$

where X=LLLL, LHLL, HLLL or HHLL, is performed.

The frequency band signals LLLL[i", j'], LHLL[i", j'], HLLL[i", j'] and HHLL[i", j'] from vertical upsampling are interpolated in the vertical direction by the vertical low-pass filter 62 or the vertical high-pass filter 63 and then supplied to associated adders 91. It is necessary for these synthesis filters to satisfy the relation of the equations (4) and (5) in conjunction with the associated analysis filters, as explained previously. If the analysis filter as shown in Table 1 is used, the filter shown in Table 1 is used as the synthesis filter.

The frequency band signals LLLL[i", j'], LHLL[i", j'], HLLL[i", j'] and HHLL[i", j'], thus interpolated, are summed together by the adders 91 and supplied to a horizontal up-sampling unit 64 where horizontal upsampling as shown by the equation (9):

$$X[i',j'] = \begin{cases} X[i'',j'] \ldots i' = 2 \times i'' \\ 0 \ldots i' = 2 \times i'' + 1 \end{cases} \quad (9)$$

where X=LLLL or HLLL, is performed.

A horizontal low-pass filter 60 and a horizontal high-pass filter 61 perform horizontal filtering on the signals from the horizontal up-sampling by way of interpolation. The two signals, thus interpolated, are summed together by the adders 91 for restoring the low frequency band signal LL[i', j']. The restored signals are stored in a memory 92.

The restored signal LL[i', j'] and the input signals LH[i', j'], HL[i', j'] and HH[i', j'] are read out from the associated memory 92 and processed in the same way as for band synthesis processing as described above for reconstructing the picture signal I[i, j].

Although not shown, if the picture signal is split in ten bands, a similar synthesis operation is executed for forming the input signal LLLL.

Figure 6:
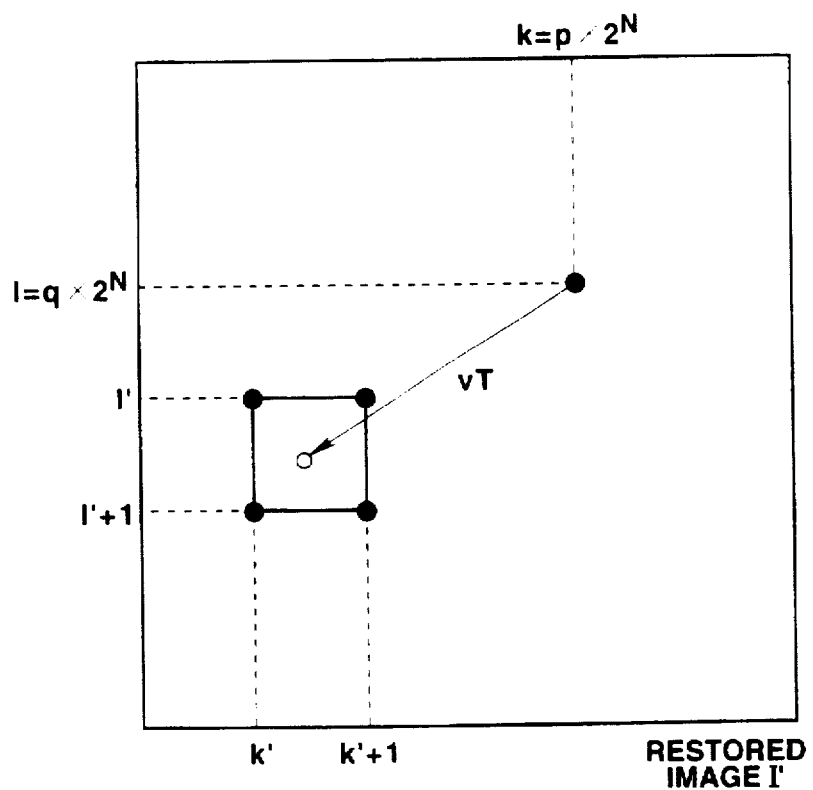
FIG. 6 is a diagrammatic view for illustrating the method for calculating prediction values in a motion compensator.

FIG. 6 shows a method for calculating prediction values in the motion compensator 13 (predicted wavelet coefficients). I' is a picture already restored by the inverse wavelet transform unit 24 and stored in a frame memory, not shown, of the motion compensator 13. W[p, q] is a wavelet coefficient to be predicted. If the wavelet coefficient is that obtained by the N-stage band splitting, N sub-sampling operations have been carried out in each of the horizontal and vertical directions until this coefficient is derived. This indicates that the coefficient W[p, q] corresponds to a position specified by an equation $(k, l)=(p^* 2^N, q^* 2^N)$ on the original picture and hence the prediction value (predicted wavelet coefficient) can be calculated from four positions (k', l'), (k'+1, l'), (k', l'+1) and (k'+1, l'+1) on a picture I'in the frame memory, not shown, as indicated by the equation (1) for the conventional example. It is noted that k' and l' are integer coordinates values represented by the equations (10) and (11):

$$k'=\text{int } (k +vx(k,l)T) \quad (10)$$

$$l'=\text{int } (l+vy(k,l)T) \quad (11)$$

by the motion vector $v=(vx(k, l), vy(k, l))$ associated with the position (k,l), obtained by the motion vector detector 11.

As in the equation (1), T denotes the time difference between the time point of entry of a picture corresponding to the wavelet coefficient currently being predicted and the time point of entry of the picture I' held in the frame memory, while int(x) denotes a maximum integer not exceeding x. However, the data held in the frame memory is the pixel value of the picture I', such that, for predicting the wavelet coefficient W[p,q], it is necessary to convert the pixel values I'(k', l'), I'(k'+1, l'), I'(k', l'+1) and I'(k'+1, l'+1) at the four positions into wavelet coefficients in the frequency bands to which belongs the coordinate W[p,q]. The method for converting a pixel value at an arbitrary position on the picture I' into the wavelet coefficient of the desired frequency band is explained with reference to prediction of the wavelet coefficient LHLL[i", j"] obtained by the second-stage splitting by the wavelet transform unit 14 shown in FIG. 4.

As may be seen from FIG. 4, the wavelet coefficient LHLL[i", j"] is calculated by performing two vertical high-pass filtering operations, one vertical low-pass filtering operation and one vertical high-pass filtering operation on the input picture signal. However, the first-stage filtering operation is performed on the input signal, while the second-stage filtering is performed after each of the sub-sampling in the horizontal direction and in the vertical direction. Therefore, the second-stage filtering is equivalent to filtering the picture prior to sub-sampling with up-sampling the original filter coefficient as indicated by the equation (9). If, for example, an analysis filter such as one shown in Table 1 is used, the second-stage filtering ie equivalent to filtering the input picture in accordance with the following Table 3:

TABLE 3

| tap numbers | coefficients |
|---|---|
| (for low-pass filter) | |
| [0] | 0.046875 |
| [1] | 0.0 |
| [2] | −0.093750 |
| [3] | 0.0 |
| [4] | −0.250000 |
| [5] | 0.0 |
| [6] | 0.593750 |
| [7] | 0.0 |
| [8] | 1.406250 |
| [9] | 0.0 |
| [10] | 0.593750 |
| [11] | 0.0 |
| [12] | −0.250000 |
| [13] | 0.0 |
| [14] | −0.093750 |
| [15] | 0.0 |
| [16] | 0.046875 |
| (for high-pass filter) | |
| [0] | 0.500000 |
| [1] | 0.0 |
| [2] | −1.000000 |
| [3] | 0.0 |
| [4] | 0.500000 |

More generically, the filtering carried out at the Mth stage splitting is equivalent to filtering and up-sampling the original filter coefficients a (M-1) number of times for the original picture.

Thus, for transforming the pixel values on the picture I' held in the frame memory, not shown, into wavelet coefficients of the frequency range to which belongs the coefficient LHLL[i", j"], it suffices to perform up-sampling on the original low-pass filter coefficients and the up-sampled low-pass filter coefficients in the horizonal direction and to perform up-sampling on the original low-pass filter coefficients and the up-sampled high-pass filter coefficients in the vertical direction. Meanwhile, two consecutive filtering operations can be realized by a single filter obtained by convolution of the two filters, as indicated by the equation (12):

$$y=g^*(f^*x)=(g^*f)^*x \quad (12)$$

where f, g denote arbitrary linear filters and * denote filtering, that is convolution operations.

Figure 7:
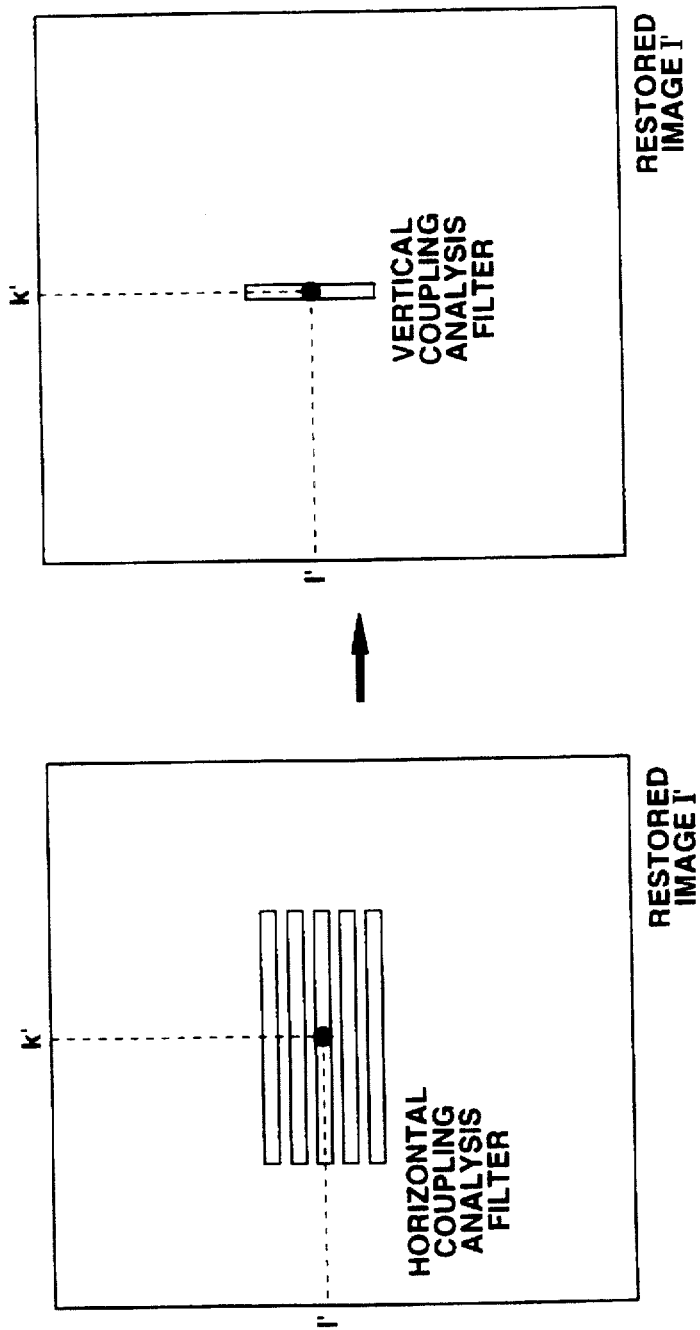
FIG. 7 is a diagrammatic view for illustrating the method for calculating the inner product for calculating prediction values.

Thus it is possible to execute up-sampling for the analysis filter used for wavelet splitting or the convolution of the resulting filters in advance to generate horizontal and vertical filters for the respective frequency bands. By employing the filter, thus generated, referred to hereinafter as a coupling analysis filter, the wavelet coefficients W'[k'.l'] at an arbitrary position on the picture I' can be calculated by the processing shown in FIG. 7.

That is, the horizontal coupling analysis filters are placed so that outputs will be obtained at a position under consideration (k', l') and at the positions several lines above and below the position under consideration, and an inner product operation between the filter coefficients and the corresponding pixel values is calculated for finding a filter output value. The number of lines used is selected so that the number will be equal to the number of taps of the vertical coupling analysis filter and so that, if the vertical filtering is performed on these lines, an output value will be obtained at a vertical coordinate I'. After calculations in the horizontal direction for plural lines, an inner product is found of the resulting data string in the vertical direction and the coefficients of the coupling analysis filter in the vertical direction may be found for deriving a wavelet coefficient W'(k',l') at a position (k', l'). Similarly, wavelet coefficients W'(k', l'), W'(k'+1, l'), W'(k', l'+1 ) and W'(k'+1, l'+1) at the four positions shown in FIG. 6 are found and substituted into the equation (13):

$$W''[p,q] = (W[k',l'] + W[k'+1,l'] + W[k',l'+1] + W[k'+1,l'+1])/4 \quad (13)$$

(13)

to derive predicted values W"(p,q) of the coefficients W(p,q) to be now predicted.

Figure 8:
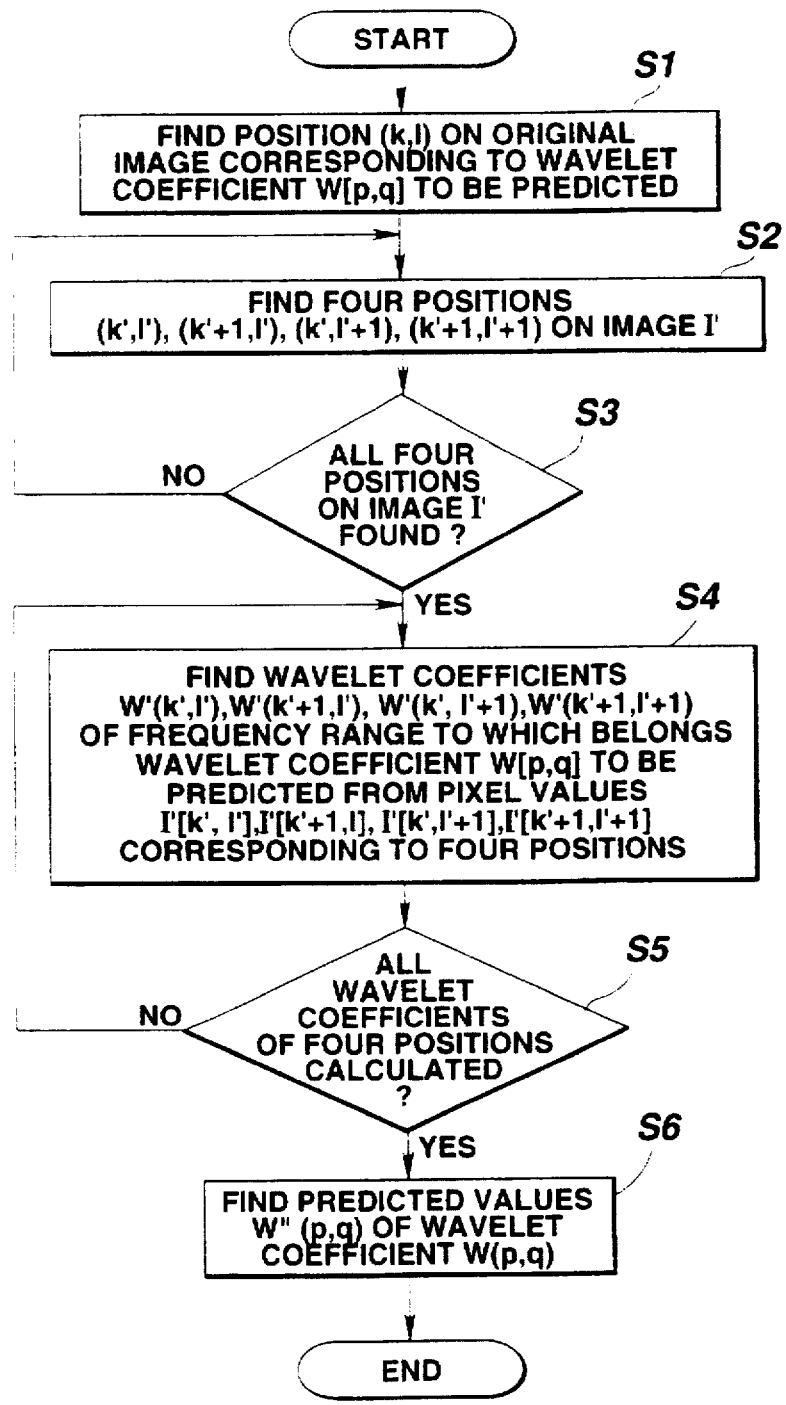
FIG. 8 is a flowchart for illustrating the operation of a motion compensator of a picture encoder according to a first embodiment.

The operation of the above-described motion compensator 13 is explained by referring to a flowchart of FIG. 8 showing the operation of finding the predicted value in the motion compensator 13.

First, at step S1, the position (k,l) on the original picture to which corresponds the wavelet coefficient W[p,q] to be predicted is found based on the equation $(k,l)=(p \times 2^N, q \times 2^{2n})$. Processing then transfers to step S2 where the four positions (k', l'), (k'+1, l') , (k', l'+1) and (k'+1, l'+1) in the picture I' stored in the frame memory, not shown, of the motion compensator 13 associated with the four positions (k, l), (k+1, l) (k', l+1) and (k+1, l+1) are sequentially calculated based on the equations (10) , (11). At step S3, it is checked whether or not the four positions in the picture I' stored in the frame memory, not shown, of the motion compensator 13 have been calculated in their entirety. If the calculations at the four positions have been completed in their entirety, processing transfers to step S4, where the pixel values I'(k', l') , I'(k'+1, l'), I'(k', l'+1) and I'(k'+1, l'+1) at the four positions (k', l'), (k'+1, l'), (k', l'+1) and (k'+1, l'+1) as found at step S2 and the necessary neighboring pixel values to calculate wavelet coefficients corresponding to these pixel values are read out at step S4 and sequentially transformed into wavelet coefficients W'(k', l'), W'(k'+1, l'), W'(k', l'+1) and W'(k'+1, l'+1) , to which belong the wavelet coefficients W[p,q] to be predicted, using the coupling analysis filter coefficients associated with the frequency bands to which belong the wavelet coefficients W[p,q] to be predicted. At step S5, it is checked whether or not the four wavelet coefficients W'(k', l'), W'(k'+1, l'), W'(k', l'+1) and W'(k'+1, l'+1) have been calculated in their entirety. If the result of check is NO, processing reverts to step S4 to continue processing. If the result of check is YES, processing transfers to step S6. At step S6, a predicted value W"(p,q) of the wavelet coefficient W(p,q) to be predicted is calculated, in accordance with the equation (13), using the four wavelet coefficients W'(k', l'), W'(k'+1, l'), W'(k', l'+1) and W'(k'+1, l'+1) found at step S4. This processing is executed for each of the wavelet coefficient W(p,q) to be predicted.

Referring to FIGS.9 to 14B, the format of the bitstream outputted by the picture encoder 10 of the present invention is explained by referring to FIGS.9 to 14B showing the format of the bitstream of the present embodiment in accordance with a style used in ISO-IEC/JTC1/SC29/WG11 IS 13818-2. Bold letters indicate flags actually transmitted. The encoded picture signal in the present invention has a hierarchical structure made up of a sequence layer, a group-of-pictures-layer (GOP layer), a picture layer, a macro-block layer and a block layer. The sequence layer is made up of a group of pictures having a series of the same attributes. The picture layer is a sole picture having common attributes. The macro-block layer is a set of coefficients of frequency bands existing at the same position (pixel block). The block layer is made up of transform coefficients, herein wavelet coefficients. These layers will be explained subsequently.

Figure 15:
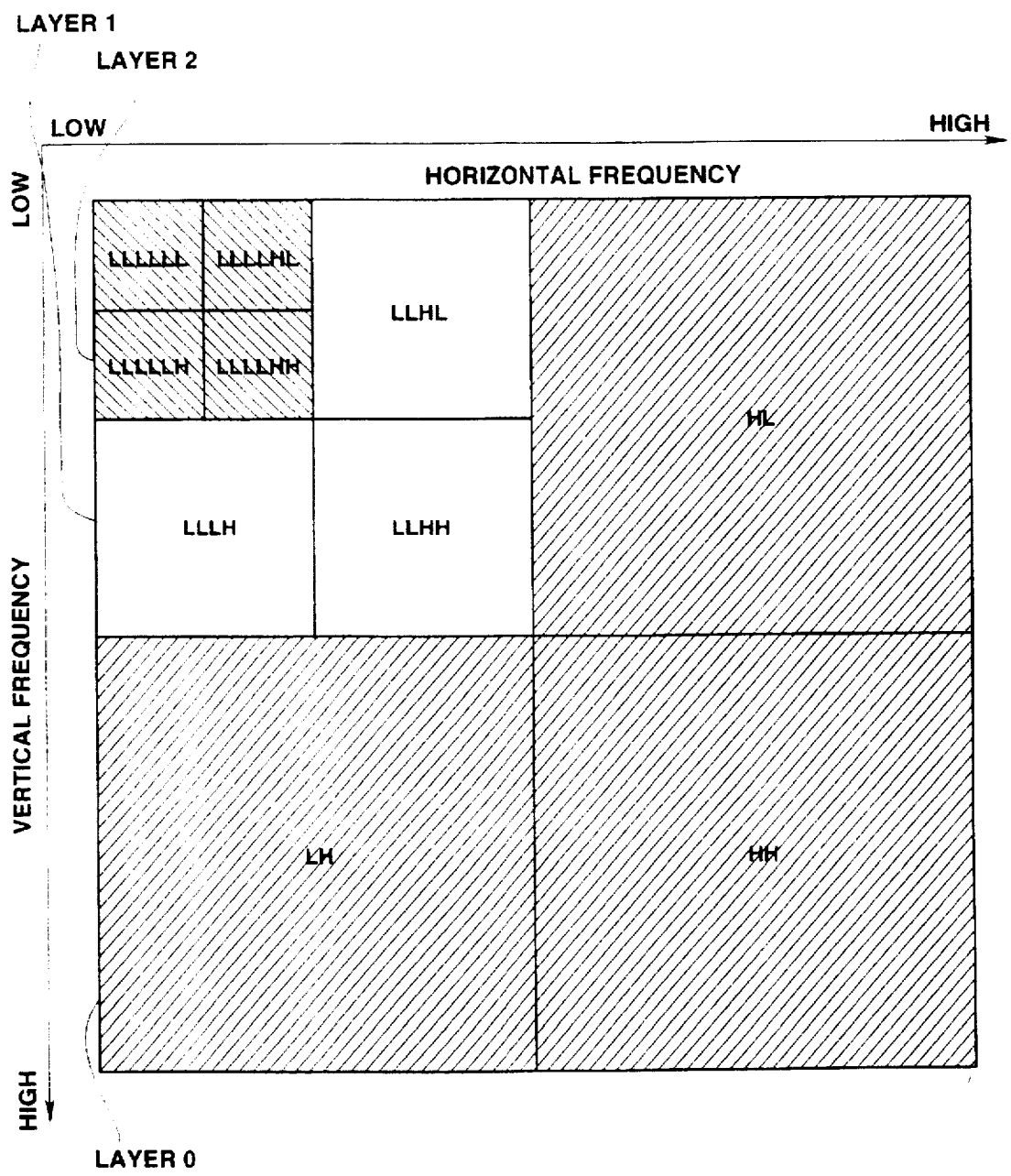
FIG. 15 is a diagrammatic view showing each of ten bands split by wavelet transform.
Figure 16:
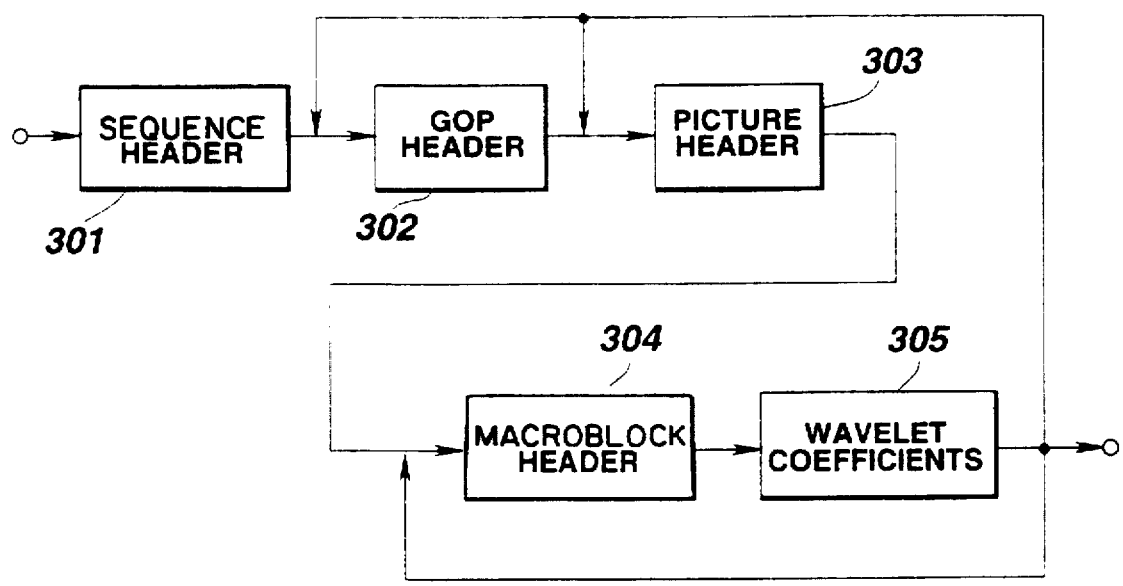
FIG. 16 is a block diagram showing the structure of a header appendage unit constituting a bitstream by a first transmitting method of the present invention.

FIG. 15 shows bands obtained on spectrum splitting into ten bands by wavelet transform, while FIG. 16 shows the structure of a header appending unit 17 for constructing a bitstream. The sequence header is added (transmitted) in a sequence header circuit 301 at the leading end of the bitstream. This initializes the decoder. Subsequently, a GOP header is added (transmitted) at the GOP header circuit 302. The picture header and the macro-block header are then added (transmitted) at the picture header circuit 303 and at the macro-block header circuit 304. The wavelet coefficients for the macro-block are then transmitted as a bitstream. After the end of transmission of the macro-block present in the same picture, processing of the next picture is started to repeat the same sequence of operations. After the end of processing of the pictures present in the same GOP, processing proceeds to the next GOP to execute the same sequence of operations.

The macro-block is now explained. Each macro-block is made up of coefficients present at the same position in each frequency band. That is, each macro-block is made up of a wavelet coefficients present at the same position of each of LLLLLL, LLLLHL, LLLLHH and LLLLLH bands, four wavelet coefficients present at the same positions of each of LLHL, LLHH and LLLH bands associated with the positions of the coefficients of the four frequency bands, and 16 wavelet coefficients present at the same positions of each of HL, HH and LH bands associated with the positions where the above seven frequency bands exist, totalling 64 wavelet coefficients, as shown in FIG. 12. Specifically, these coefficients, differing in the frequency bands, are derived from the picture present at the same positions in the original picture. The format of each header will be explained subsequently.

FIG. 9 shows the format of a sequence header. A code sequence_header_code is a 32-bit code specifying the start of a sequence header. Besides this sequence_header_code, various start codes are each an inherent bitstring which is a code not generated in any other portions of the bitstream. Therefore, if part of the bitstream is lost for some reason such that a picture cannot be reproduced, decoding becomes again feasible by finding this start code. A code horizontal_ size_value specifies the number of horizontal pixels of a picture by 12 bits, while a code vertical size_value specifies the number of vertical pixels of a picture by 12 bits. A code aspect_rate_information specifies the aspect ratio of a picture by 4 bits, while a code frame_rate_code specifies the picture display period by 4 bits. A code bit_rate value specifies the number of bits per second by 18 bits, while a code marker_bit is a value of a bit "1"and a code vbv_ buffer size_value specifies a parameter specifying the size of a code generation amount controlling virtual buffer by 10 bits.

In the sequence header, a code wavelet_layer_number is a 4-bit flag specifying by which number of layers or by which number of the 4-band synthesis filter banks the inverse wavelet transform circuit 24 is constituted, while a code wavelet_coefficients () defines the filter coefficients employed in the filters of the respective layers of the inverse wavelet transform circuit. The filter coefficients for inverse wavelet transform are transmitted in two ways.

FIG. 14A shows a format in case of transmitting a flag associated with the filter coefficients. That is, a flag specifying one of several previously provided sets of filter coefficients employed by the filters of each layer is transmitted. The combination of the high-pass filter and the low-pass filter is determined by setting one of the filters.

Therefore, it suffices to transmit one of the indices for each layer. In FIG. 14A, this index wavelet_coeff_index is an 8-bit flag capable of specifying 256 filter coefficient combinations. Although the index is formed by 8 bits, any arbitrary number of bits may be used.

FIG. 14B shows another transmission format of inverse wavelet transform coefficients. This format specifies a method of directly transmitting filter coefficients owned by each layer. In this case, the numbers of taps of the low-pass filter and the high-pass filter and the filter coefficients associated with the numbers of taps are transmitted. That is, the number of taps of the low-pass filter is specified by an 8-bit flag by lowpass_tap number and the filter coefficient associated with such number of bits is transmitted by wavelet_tap_coeff[ ]. The number of taps of a high-pass filter is specified by an 8-bit flag by high-pass_tap_number such that the filter coefficient associated with the number of taps is transmitted by wavelet_coeff[ ].

On the other hand, a code load_intra_weighting_matrix and a code load_non_intra_weighting_matrix are flags specifying whether or not a weighting coefficient used in an intra-macro-block and in other macro-blocks are to be down-loaded. If the weighting coefficients are down-loaded, the respective flags are succeeded by weighting coefficients. This gives a data size of 8 bits (wavelet_layer_number 3+1). It is noted that the number of bands is determined by wavelet_layer_number which is wavelet_layer_number 3 +1. The weighting coefficients used in the intra-macro-block and in other macro blocks differ from each other.

The GOP header is then added (transmitted). This is a header specifying the leading end of a GOP and is used mainly for random-accessing. FIG. 10 shows a GOP header in which a code group start code specifies the start of a GOP and is represented in 32 bits. A code time_code specifies the time as from the leading end of a sequence by a 25-bit flag. A code closed_gop is a 1-bit flag specifying that a picture in a GOP can be reproduced independently from other GOPs, while 'a code broken_link specifies that a previous GOP data cannot be used for editing. Next to the 1-bit GOP header is added (transmitted) a header specifying the beginning of data of each picture.

FIG. 11 shows a picture header format, in which a code number of_macroblock is a 16-bit flag specifying the number of macro-blocks present in a frame. Among other flags, a flag picture start_code is a 32-bit flag specifying the start of a picture, while a code temporal_reference is a 10-bit flag for a sequential number of a picture. A code picture_coding_type is a 3-bit flag specifying the picture type, while a code vbv_delay is a 16-bit flag specifying an initial state of a buffer during random accessing. A code full_pel_forward_vector is a 1-bit flag specifying whether the motion vector precision is an integer or half-pel-based, while a code forward_f_code specifies the range of description of the forward motion vector. A code full_pell backward_vector is a 1-bit flag specifying whether the motion vector precision is an integer or half-pel-based, while a code backward_f_code specifies the range of description of the backward motion vector.

FIGS.13A and 13B show the format of a motion vector header. A code motion_vector(s) has a subroutine motion_vector(s), while a code motion_horizontal_code shows the variable-length-coded difference between the horizontal component of a motion vector of a macro-block and the motion vector of the previous motion vector and may be a flag of 1 to 11 bits. A code motion_horizontal_r is a flag used in conjunction with a code motion_horizontal_code and is represented by 1 to 8 bits. A code dmv_horizontal is a variable length coded flag of 1 or 2 bits specifying a horizontal difference vector in case of dual prime prediction. A code motion_vertical_code is a flag of 1 to 11 bits comprised of a variable-length-coded difference between the vertical component of a motion vector of a macro-block and the previous motion vector. A code motion vertical r is a flag of 1 to 8 bits used in conjunction with a code motion vertical_code, while a code dmv_vertical is a flag of 1 or 2 bits comprised of a variable-length coded horizontal difference vector in case of dual prime prediction.

A first transmitting method for picture data is explained. It is assumed that motion compensation and quantization are executed on the macro-block basis. The first transmitting method transmits the motion vectors, quantization scales and wavelet coefficients in a picture together as a unit. That is, as shown in FIG. 16, a macro-block header is added (transmitted) next to a picture header and subsequently the wavelet coefficient associated with the macro-block is transmitted. After transmitting the macro-blocks in a picture in their entirety in this manner, the next picture header or the GOP header is transmitted. FIG. 12 shows a macro-block header in this case. Specifically, a code macroblock_escape specifies a 11-bit escape code, while a code macroblock_address_increment is a variable length coded 1 to 11 bit code representing the number of macro-blocks to be skipped in advance plus 1, that is a flag specifying the number of macro-blocks from the right end of a picture plus 1. A code macroblock_type is a 1 to 9 bit variable-length-coded code specifying the encoding mode of a macro-block. A code macroblock_size is a 2 -bit flag specifying the macro-block size, while a code mc_code is a 1 -bit flag specifying the direction of motion vector prediction. A code intra_dc_size luminance is a 2 to 9 bit flag specifying the size of a luminance signal of an LLLLLL band of an intra-block, while a code intra_dc differential is a flag having 1 to 11 bits specifying its value. A code intra_dc_size chrominance is a 2 to 9 bit flag specifying the size of a chrominance signal of the LLLLLL band of an intra-block, while a code intra_dc_differential is a flag having 1 to 11 bits specifying its value.

Figure 17:
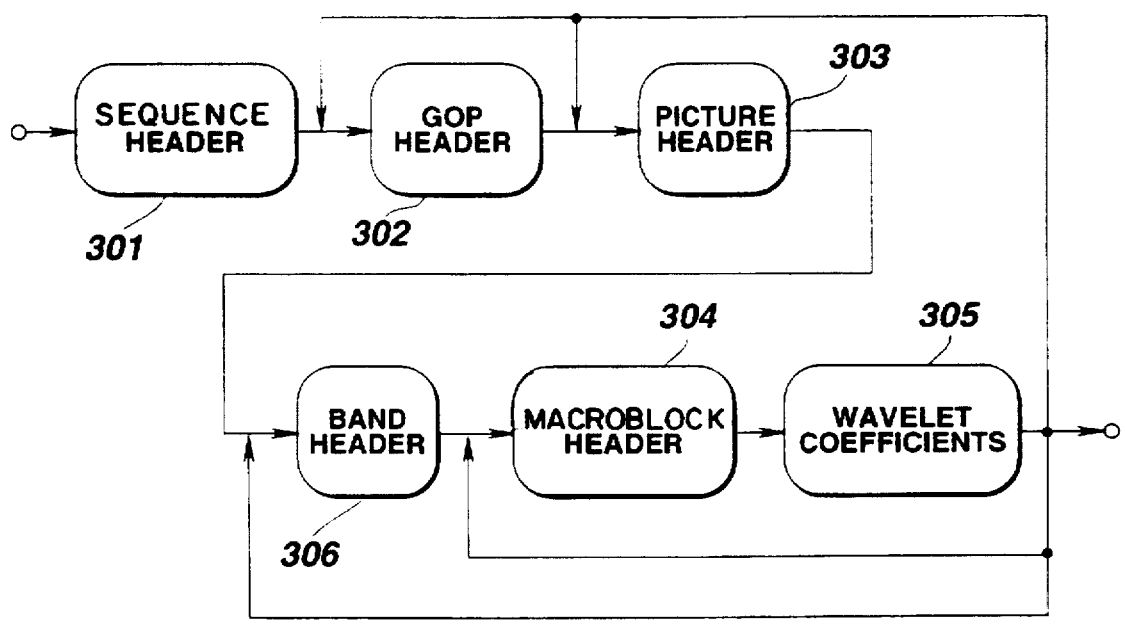
FIG. 17 is a block diagram showing the structure of a header appendage unit constituting a bitstream by a second transmitting method of the present invention.

A second transmitting method for picture data is now explained. The second transmitting method is a modification of the first transmitting method. The wavelet coefficients are transmitted on the band basis. The structure of a bitstream in this case is shown in FIG. 17. First, a low frequency component, or LLLLLL component in the case of FIG. 15, is transmitted. In this case, after the picture header is transmitted, a band header is added (transmitted) in a band-header circuit 306. The band header is a header specifying which band data of FIG. 15 is started, and has a sync code appended thereto. Next to this band header, a macro-block header and the associated coefficient of the LLLLLL band are transmitted. The next band header is then transmitted, and the same sequence of operations is repeated. After all of the bands have been processed, the operation of transmitting the next picture or the GOP header is started.

Figure 18:
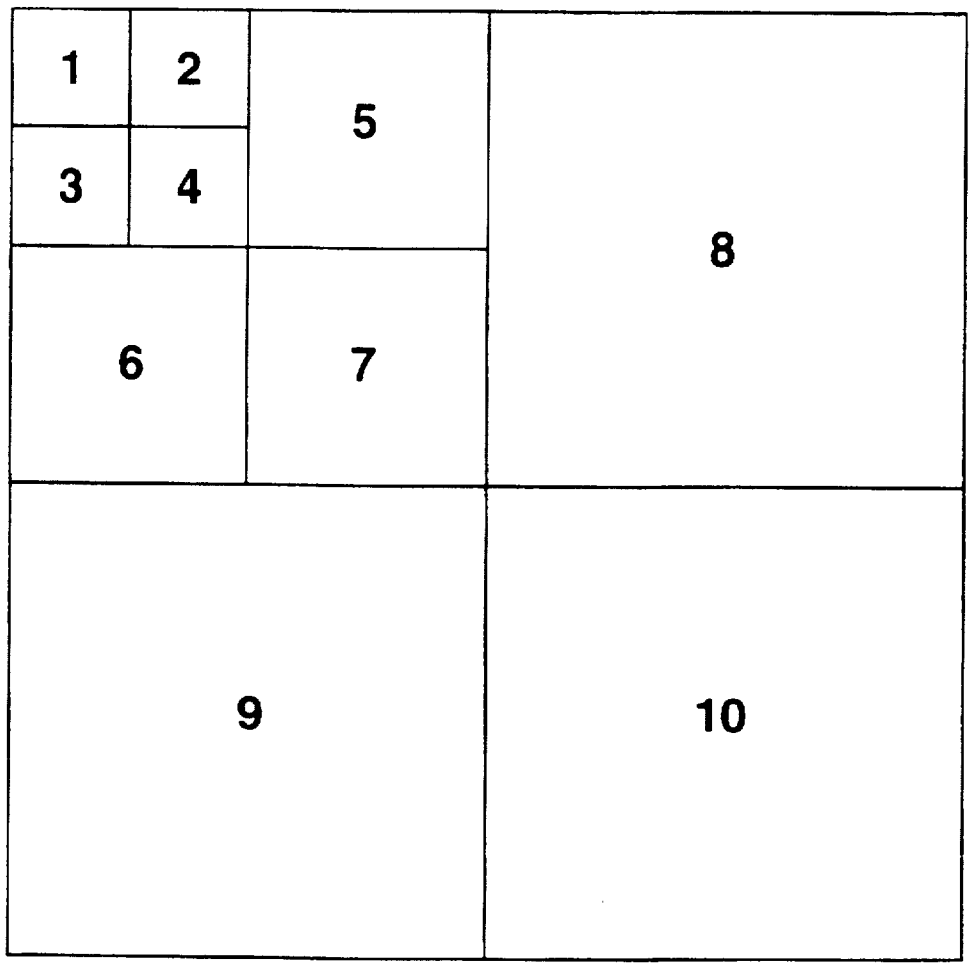
FIG. 18 is a diagrammatic view showing the sequence of transmitted bands.

FIG. 18 shows the sequence of transmission of the ten split bands. In the next band, wavelet coefficients are transmitted in the same sequence as LLLLLL after transmitting the band header. At this time, the macro-block header is not transmitted. Since the macro-block is made up of wavelet coefficients of the respective bands, a macro-block header has already been added (transmitted) when transmitting the coefficients of the LLLLLL band. After transmitting the all of the bands in this manner, the next picture header or the GOP header is transmitted. The format of the band header is shown in FIG. 19, while the header of the macro-block header in this case is shown in FIG. 20, and has a flag band_start_code and a flag band_id, as shown in FIG. 19. A code band start code is a 32-bit flag specifying the start of the band, while a code band_id is a 6-bit flag specifying its band.

Figure 21:
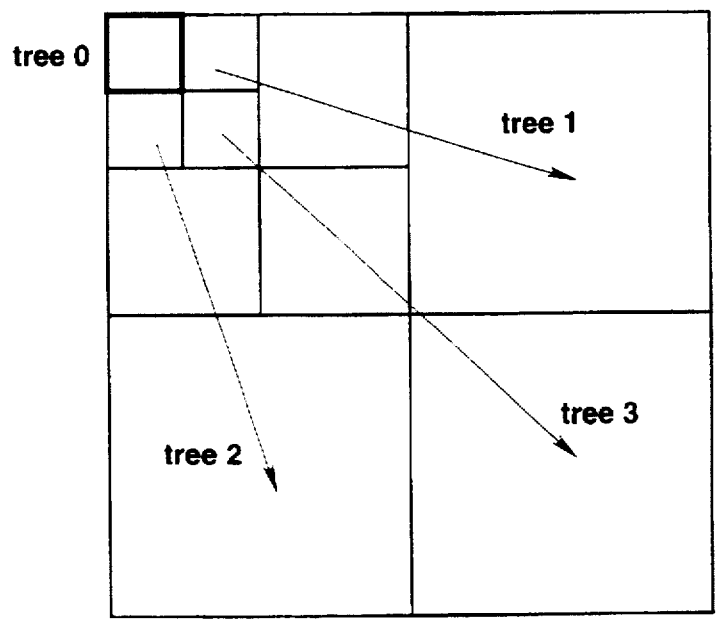
FIG. 21 is a diagrammatic view showing wavelet coefficients in a tree structure.
Figure 22:
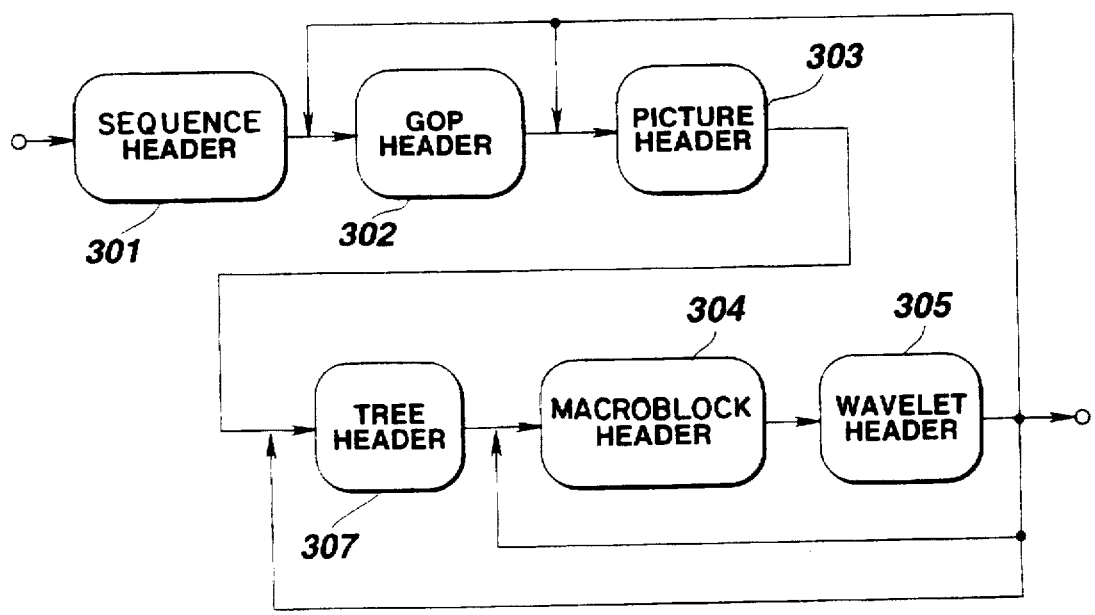
FIG. 22 is a block diagram showing the structure of a header appendage unit constituting a bitstream according to a third transmission method according to the present invention.

A third transmitting method for picture data is now explained. The third transmitting method is a modification of the first transmitting method. The wavelet coefficients may be constructed in a tree structure as shown in FIG. 21. That is, the LLLLH, LLHL and HL bands are constructed as a tree (tree 1), while the LLLLHL, LLHH and HH bands are constructed as a tree (tree 2) and the LLLLLH, LLLH and LH bands are constructed as a tree (tree 3). The third transmitting method transmits data in tree units. The structure for forming the bitstream in this case is shown in FIG. 22. First, a tree 0 (LLLLLL band) is transmitted. That is, after transmitting the picture header, the tree header is transmitted. This tree header is a header specifying at which tree data transmission is started, and is added to with a sync code. After this tree header, a macro-block header and the wavelet coefficient associated with the tree 0 are transmitted.

The trees are transmitted in the order of tree 0, tree 1, tree 2 and treed 3. In the next tree, after transmitting the tree header, the wavelet coefficients are transmitted in the same way as for the second transmitting method. The macro-block header is not transmitted as in the second transmitting method. That is, since the macro-block is made up of wavelet coefficients of the respective bands, a macro-block header has already been added (transmitted) when transmitting the coefficients of the LLLLLL band. After transmitting all of the trees in this manner, the next picture header or the GOP header is transmitted. FIG. 23 and Table 4 show the tree header:

TABLE 4

| tree id | meaning |
|---------|---------|
| 00 | tree 0 |
| 01 | tree 1 |
| 10 | tree 2 |
| 11 | tree 3 |

That is, a code tree_start_code is a 32-bit flag specifying the start of a tree, while a code tree_id is a 2-bit flag specifying the tree.

In the second and third transmitting methods, the sync code, that is a band header and a tree header, are appended on the band basis or on the tree basis. Therefore, if a given band or tree becomes undecodable by an error or the like, data of another band or tree is decodable thereby avoiding fatal picture quality deterioration. Thus the second and third transmitting methods are strong against errors. The above transmitting methods can be applied to an encoding system employing wavelet transform.

Figure 24:
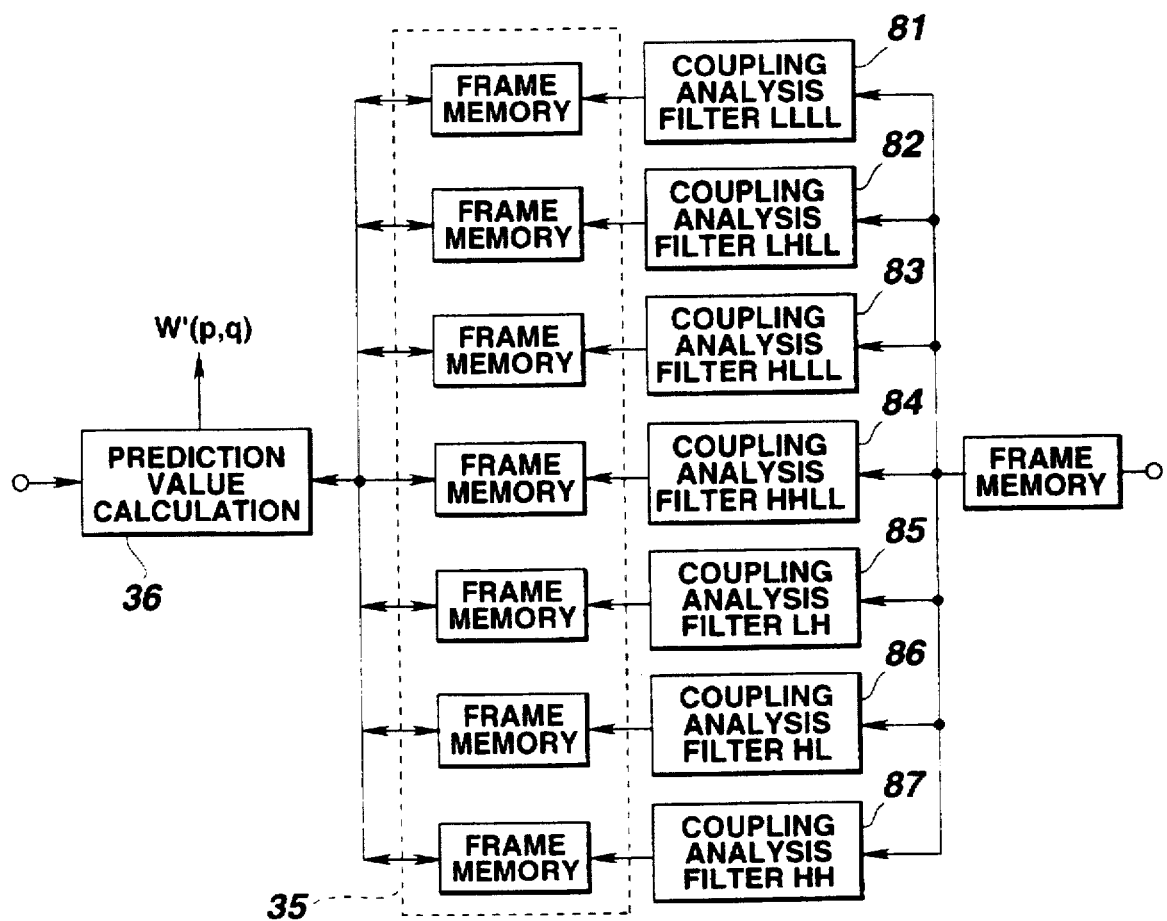
FIG. 24 is a block diagram showing the structure of a motion compensator according to a second embodiment of the present invention.

The structure of a second embodiment of the present invention will now be explained. The structure of the second embodied is the same as that of the first embodiment shown in FIGS. 2A and 2B. However, the structure of the motion compensator used is different between the first and second embodiments. FIG. 24 shows the structure of the motion compensator in the second embodiment.

A frame memory 34 is equivalent to a frame memory, not shown, of the first embodiment, and stores a picture I'restored by inverse wavelet transform. Coupling analysis filters 81 to 87 are coupling analysis filters associated with respective frequency bands, and execute coupling analysis filtering on the restored picture I' in the frame memory 34 in both the horizontal and vertical directions for the respective frequency bands explained in connection with the first embodiment. The resulting wavelet coefficients are stored in associated frame memories in a frame memory 35.

After the wavelet coefficients associated with all of the totality frequency bands have been prepared in a predicted value calculating unit 36, prediction of all of the wavelet coefficients for the picture for encoding is started. This prediction is realized by having reference to data in the frame memory associated with the frequency band to which belongs the coefficient to be predicted W(p,q) and by substituting the data in the equation (13). The operation of a prediction value calculating unit 36 is explained by referring to a flowchart of FIG. 25.

Figure 25:
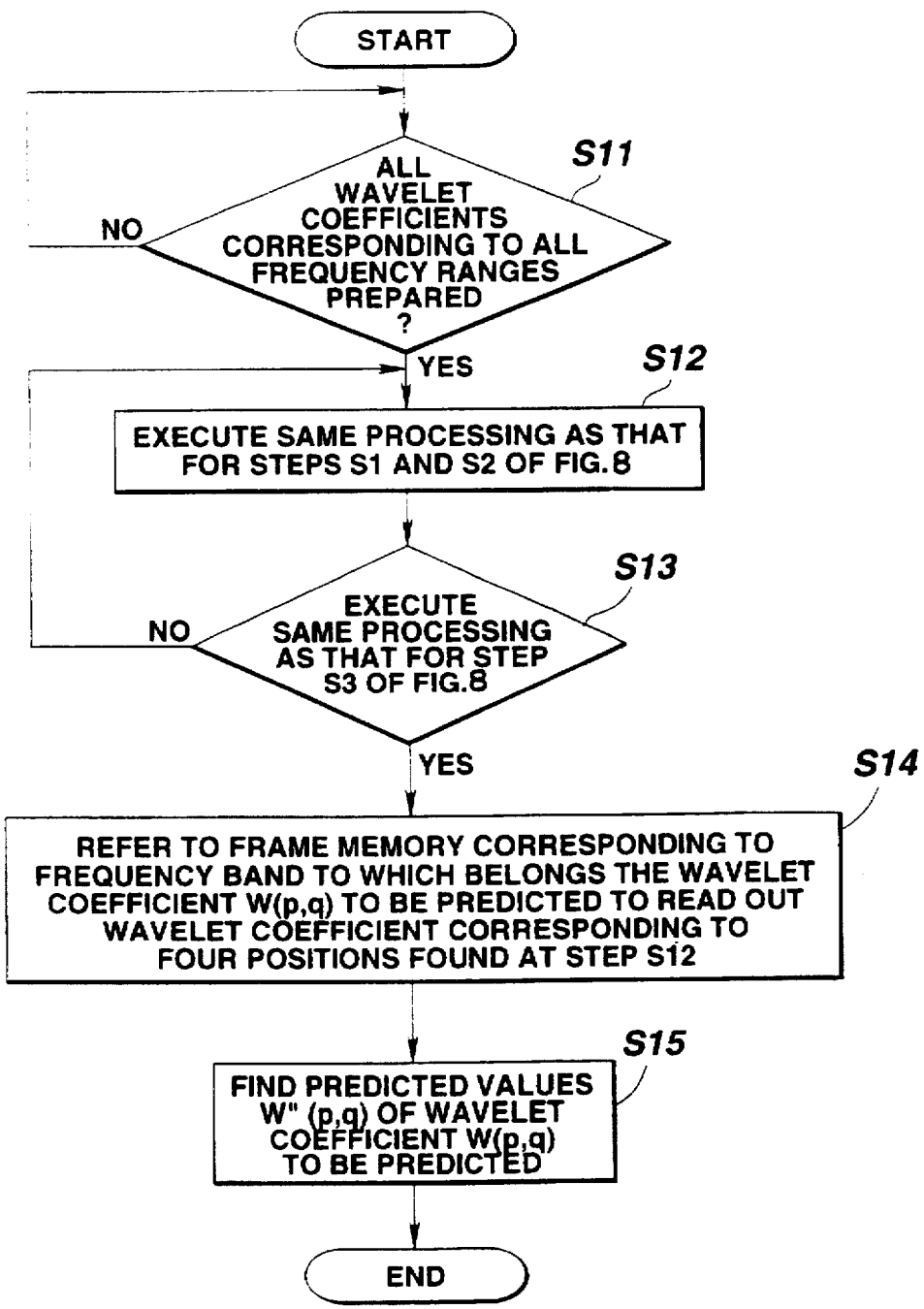
FIG. 25 is a flowchart showing the operation of a motion compensator of a picture encoder in the second embodiment of the present invention.

The flowchart shown in FIG. 25 illustrates the operation of the prediction value calculating unit 36. At step S11, it is checked whether or not the wavelet coefficients associated with the frequency bands in their entirety have been prepared in the frame memory 35 for the picture I'stored in the frame memory 34. If the result of check of step S11 is NO, a stand-by state is set until all of the wavelet coefficients have been prepared in the frame memory 34. If the result of check of step S11 is YES, processing transfers to step S12 in FIG. 8 where the same processing as that for steps S1 and S2 is carried out for calculating the four positions (k', l'), (k'+1, l'), (k', l'+1), and (k'+1, l'+1) associated with the wavelet coefficient W(p,q) to be predicted. After the calculations for all of the four positions have come to an end, processing transfers to step S14, where reference is had to data in the frame memory associated with the frequency band to which belongs the wavelet coefficient W(p,q) to be predicted for reading out the wavelet coefficients associated with the four positions calculated at step S12. At step S15, the four values thus read out are substituted into the equation (13) for calculating the predicted values W"(p,q) of the wavelet coefficient W(p,q) to be predicted.

Thus, although a number of memories equal to the number of the split frequency bands is required in the second embodiment, the processing of transforming the restored picture into wavelet coefficients is carried out at one time, and hence the calculations for filtering are not duplicated as in the first embodiment.

The structure of a third embodiment of the present invention is now explained. FIGS. 26A, 26B illustrate the structure of the third embodiment of the present invention. The present third embodiment, which is essentially the same in structure as the first embodiment shown in FIG. 1, has a second frame memory 17 and a third frame memory 18 at the back of the wavelet transform unit 14 towards the picture encoder and ahead of the inverse wavelet transform unit 18, respectively. The frame memory 17 stores wavelet-transformed waveform coefficients in an amount corresponding to one picture and sequentially outputs these coefficients from one split band to another. The frame memory 18 stores the dequantized wavelet coefficients, sequentially supplied thereto from one split band to another, in an amount corresponding to one picture, and outputs the coefficients after re-arranging them in the same sequence as that in which the coefficients were supplied to the frame memory 17. In meeting with this structure, a frame memory 18 is provided ahead of a inverse transform unit 28 in the picture decoder.

Figure 27:
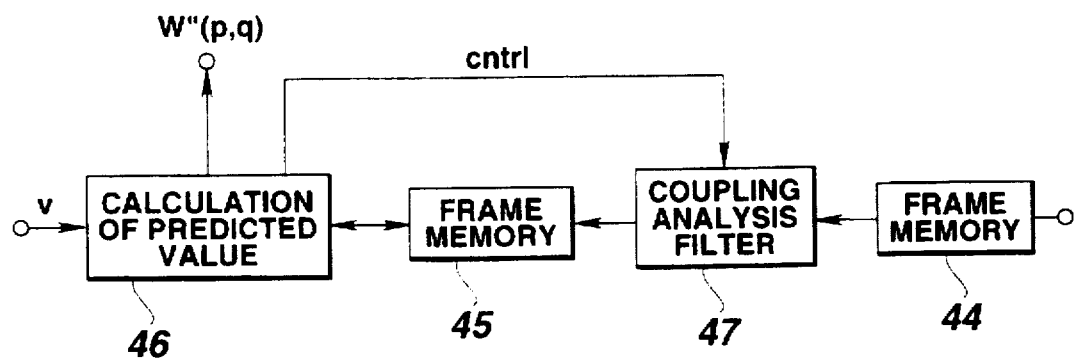
FIG. 27 is a block diagram showing the structure of a motion compensator according to the third embodiment of the present invention.

A motion compensator 43 performs prediction from one frequency band to another. FIG. 27 shows the structure of the motion compensator 43 of the third embodiment.

The frame memory 44 is equivalent to the frame memory of the first embodiment, nor shown, and holds the picture I' restored by inverse wavelet transform. A coupling analysis filter 47 filters the picture I'on the frame memory 44 in its entirety, using coupling analysis filter coefficients which correspond to a control signal cntrl supplied from a predicted value calculator 46. The resulting wavelet coefficients are stored in the frame memory 45. The predicted value calculator 46 performs prediction from one frequency band to another. However, before proceeding to such prediction, the predicted value calculator 46 sends the control signal to the coupling analysis filter 47 to advise the filter of the frequency band for which prediction is now to be performed in order to cause filtering to be performed with the use of the associated coupling analysis filter coefficients. The operation of prediction is started at a time point when the wavelet coefficients corresponding to one picture have been secured in the frame memory 45. The operation of the prediction value calculator 36 is now explained by referring to a flowchart of FIG. 28.

Figure 28:
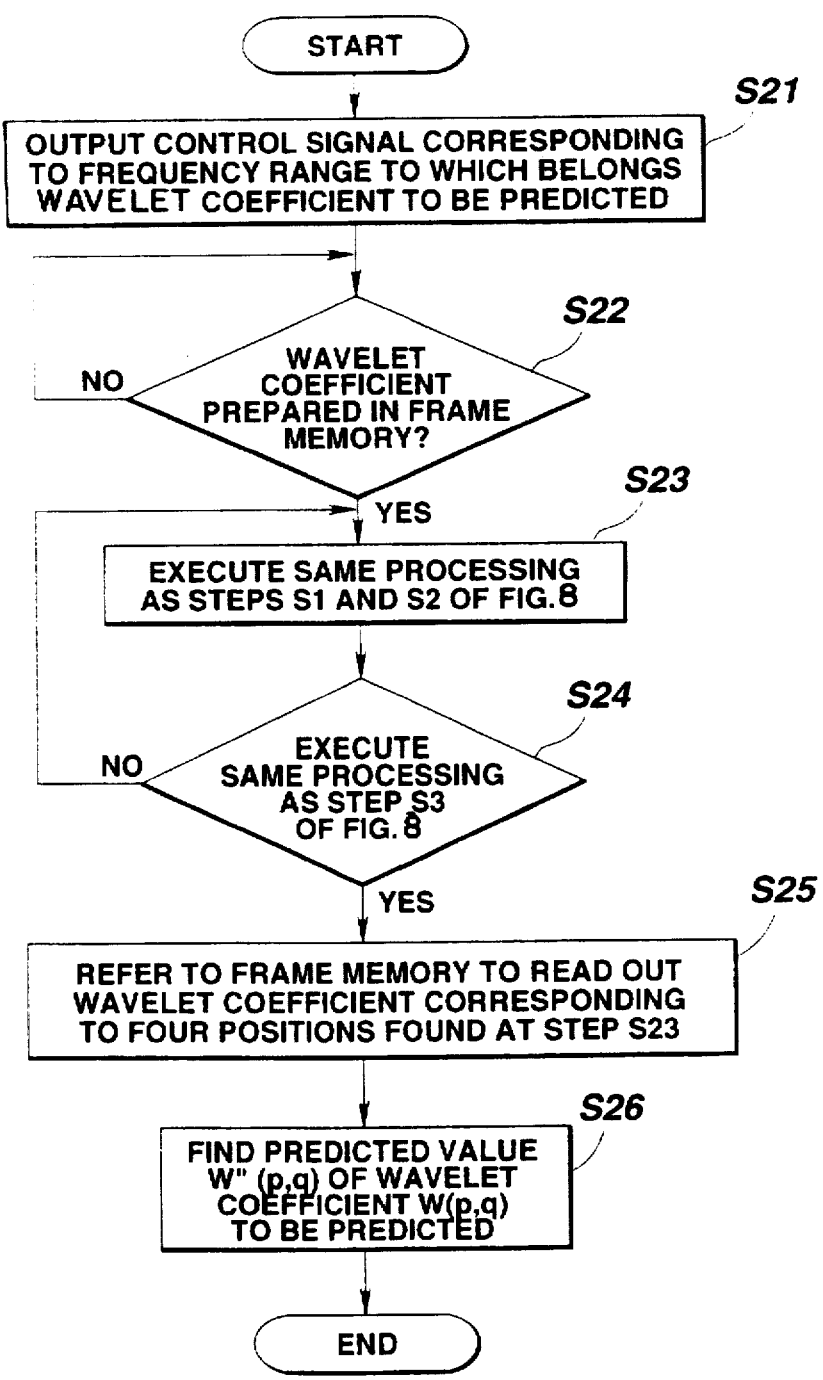
FIG. 28 is a flowchart for illustrating the operation of a motion compensator of a picture encoder according to the third embodiment of the present invention.

In FIG. 28, showing the flowchart for illustrating the operation of the prediction value calculator 46, the control signal cntrl associated with the frequency band to which belongs the wavelet coefficient to be predicted W(p,q) is supplied at step S21 to the coupling analysis filter 47. The coupling analysis filter 47 then executes filtering employing the coupling analysis filter coefficient corresponding to the control signal on the picture I' supplied from the frame memory 44. Processing then transfers to step S22 in order to check whether or not the wavelet coefficient processed by the coupling analysis filter 47 has been prepared in the frame memory 45. If the result of the checking is NO, that is if the wavelet coefficient matched to the frequency band in subject has not been secured in the frame memory 45, a stand-by state is set to wait until the wavelets coefficient is secured. If it has been found that the wavelet coefficient matched to the frequency band in subject has been secured in the frame memory 45, processing transfers to step S23, where the same operation as that in steps S1 and S2 in FIG. 8 are executed for calculating the four positions (k', l'), (k'+1, l'), (k', l'+1) and (k'+1, l'+1) associated with the wavelet coefficient W(p,q) to be predicted. At step S24, it is judged, as in step S3 in FIG. 8, whether or not the four positions have been calculated in their entirety. After the end of all calculations for the four positions, processing transfers to step S25, where reference is had to data in the frame memory 45 to read out the wavelet coefficients associated with the four positions calculated st step S23. At step S26, the four values thus read out are substituted into the equation (13) for calculating the predicted value W"(p,q) of the wavelet coefficient W(p,q) to be predicted.

Thus, with the third embodiment of the present invention, while the frame memories 17, 18 for re-arranging the wavelet coefficients are required, overlapping of the calculations for filtering as that produced in the first embodiment is not produced. On the other hand, only a one-picture frame memory suffices for storage of the wavelet coefficients.

Although only LL signals from the first stage of band splitting are further split in frequency by wavelet transform in the above embodiment, the number of bands for splitting/synthesis or the number of times of frequency splitting may be arbitrarily set so long as filter pairs satisfying the equations (4) or (5) are used. The present invention may be applied to any of the manners of splitting/synthesis or the number of times of splitting.

Although the same filter pairs are used for first and second stages of frequency splitting/synthesis, different filter pairs may also be used in the respective stages. Moreover, different filter pairs may be used for splitting in the vertical and horizontal directions.

While the present invention is concerned with motion compensation, any motion detection system may be used in connection with motion compensation.

In a known motion compensation system, a picture now to be predicted is forward-predicted or backward-predicted using a past picture and a future picture. Such bi-directional prediction may similarly be feasible and is within the scope of the present invention.

Although a filter for wavelet transform is used in the above-described embodiment, a filter for sub-band encoding may be used for performing the same operation.

Although the present invention has been described by a block diagram in the above-described embodiments, the arrangement of the present invention may also be represented as a software and processed by, for example, a CPU.

According to the present invention, edge-like deterioration appearing on the block boundary is moderated by inverse wavelet transform or inverse sub-band transform for suppressing adverse effects on a decoded picture.

Moreover, according to the present invention, sync codes may be added to each sub-band (wavelet) for avoiding fatal deterioration in the encoded picture even in case data of a given band is lost.

The present invention may be modified within the scope of the invention without departing from the scope thereof and hence is not limited by the preferred embodiments.

What is claimed is:

1. Apparatus for encoding a picture signal defining a picture, comprising:

motion vector detection means for detecting a motion vector from said picture signal;

sub-band transform means for spectrum dividing said picture signal using a sub-band transform to generate a number of sub-band coefficients;

coefficient difference calculating means for calculating a difference value between the sub-band coefficients and respective predicted sub-band coefficients;

encoding means for encoding said difference value and for generating an encoded signal based on the encoded difference value;

decoding means for locally decoding the generated encoded signal to generate a decoded difference value;

motion compensation means for generating the predicted sub-band coefficients based on said motion vector and a picture that has been previously restored, said motion compensation means including means for determining on said picture a position corresponding to one of the predicted sub-band coefficients, means for obtaining on said picture a number of positions neighboring the determined position, means for determining a picture value corresponding to each of the obtained positions, means for calculating a sub-band coefficient corresponding to each of the determined picture values, and means for calculating a predicted sub-band coefficient as a function of the calculated sub-band coefficients;

addition means for adding the predicted sub-band coefficients and the decoded difference value to generate respectively restored sub-band coefficients; and inverse sub-band transform means for inverse sub-band transforming the restored sub-band coefficients and for generating the restored picture.

2. The apparatus as claimed in claim 1 wherein the sub-band coefficients are wavelet coefficients.

3. The apparatus as claimed in claim 1 wherein said motion compensation means is adapted to filter the restored picture in accordance with a frequency band corresponding to said one predicted sub-band coefficient.

4. Apparatus for decoding a picture signal defining a picture, comprising:

receiving means for receiving said picture signal including at least a motion vector and an encoded difference value between a number of sub-band coefficients and respective predicted sub-band coefficients;

separation means for separating said motion vector from the encoded difference value;

decoding means for decoding the encoded difference value to generate a decoded difference value;

motion compensation means for generating the predicted sub-band coefficients based on said motion vector and a picture that has been previously restored, said motion compensation means including means for determining on said picture a position corresponding to one of the predicted sub-band coefficients, means for obtaining on said picture a number of positions neighboring the determined position, means for determining a picture value corresponding to each of the obtained positions, means for calculating a sub-band coefficient corresponding to each of the determined picture values, and means for calculating a predicted sub-band coefficient as a function of the calculated sub-band coefficients;

coefficient addition means for adding the decoded difference value and the generated predicted sub-band coefficients; and inverse sub-band transform means for inverse sub-band transforming the sub-band coefficients received from said coefficient addition means and for generating the restored picture.

5. The apparatus as claimed in claim 4 wherein said sub-band coefficients are wavelet coefficients.

6. The apparatus as claimed in claim 4 wherein said motion compensation means is adapted to filter the restored picture in accordance with a frequency band corresponding to said one predicted sub-band coefficient.

7. A method for encoding a picture said defining a picture, comprising the steps of:

detecting a motion vector from said picture signal;

spectrum dividing said picture signal using a sub-band transform to generate a number of sub-band coefficients;

calculating a difference value between the sub-band coefficients and respective predicted sub-band coefficients;

encoding said difference value and generating an encoded signal based on the encoded difference value;

locally decoding the generated encoded signal to generate a decoded difference value;

generating the predicted sub-band coefficients based on said motion vector and a picture that has been previously restored, said step of generating the predicted sub-band coefficients including determining on said picture a position corresponding to one of the predicted sub-band coefficients, obtaining on said picture a number of positions neighboring the determined position, determining a picture value corresponding to each of the obtained positions, calculating a sub-band coefficient corresponding to each of the determined picture values, and calculating a predicted sub-band coefficient as a function of the calculated sub-band coefficients;

adding the predicted sub-band coefficients and the decoded difference value to generate respectively restored sub-band coefficients; and inverse sub-band transforming the restored sub-band coefficients and generating the restored picture.

8. The method as claimed in claim 7 wherein the sub-band coefficients are wavelet coefficients.

9. The method as claimed in claim 7 wherein said step of generating the predicted sub-band coefficients includes filtering the restored picture in accordance with a frequency band corresponding to said one predicted sub-band coefficient.

10. A method for decoding a picture signal defining a picture, comprising the steps of:

receiving said picture signal including at least a motion vector and an encoded difference value between a number of sub-band coefficients and respective predicted sub-band coefficients;

separating said motion vector from the encoded difference value;

decoding the encoded difference value to generate a decoded difference value;

generating the predicted sub-band coefficients based on said motion vector and a picture that has been previously restored, said step of generating the predicted sub-band coefficients including determining on said picture a position corresponding to one of the predicted sub-band coefficients, obtaining on said picture a number of positions neighboring the determined position, determining a picture value corresponding to each of the obtained positions, calculating a sub-band coefficient corresponding to each of the determined picture values, and calculating a predicted sub-band coefficient as a function of the calculated sub-band coefficients;

adding the decoded difference value and the generated predicted sub-band coefficients; and inverse sub-band transforming the sub-band coefficients resulting from said adding step to generate the restored picture.

11. The method as claimed in claim 10 wherein the sub-band coefficients are wavelet coefficients.

12. The method as claimed in claim 10 wherein said step of generating the predicted sub-band coefficients includes filtering the restored picture in accordance with a frequency band corresponding to said one predicted sub-band coefficient.

13. A method for transmitting a picture signal defining a picture, comprising the steps of:

detecting a motion vector from said picture signal;

spectrum dividing said picture signal using a sub-band transform to generate a number of sub-band coefficients;

calculating a difference value between the sub-band coefficients and respective predicted sub-band coefficients;

encoding said difference value and generating an encoded signal based on the encoded difference value;

locally decoding the generated encoded signal to generate a decoded difference value;

generating the predicted sub-band coefficients based on said motion vector and a picture that has been previously restored, said step of generating the predicted sub-band coefficients including determining on said picture a position corresponding to one of the predicted sub-band coefficients, obtaining on said picture a number of positions neighboring the determined position, determining a picture value corresponding to each of the obtained positions, calculating a sub-band coefficient corresponding to each of the determined picture values, and calculating a predicted sub-band coefficient as a function of the calculated sub-band coefficients;

adding the predicted sub-band coefficients and the decoded difference value to generate respectively restored sub-band coefficients;

inverse sub-band transforming the restored sub-band coefficients and generating the restored picture; and transmitting a bitstream comprised of said motion vector and the encoded difference value.

14. The method as claimed in claim 13 wherein said bitstream includes a header that is added to the generated encoded signal.

15. A recording medium adapted to be decoded by decoding apparatus wherein said recording medium has a signal recorded thereon, said signal including a motion vector value detected from a picture signal and an encoded differential sub-band coefficient value calculated between a sub-band coefficient obtained by frequency spectrum dividing said picture signal using a sub-band transform and a respective predicted sub-band coefficient; said each predicted sub-band coefficient being generated on the basis of said motion vector and a picture that has been previously restored, said generating including determining on said picture a position corresponding to one of the predicted sub-band coefficients, obtaining on said picture a number of positions neighboring the determined position, determining a picture value corresponding to each of the obtained positions, calculating a sub-band coefficient corresponding to each of the determined picture values, and calculating a predicted sub-band coefficient as a function of the calculated sub-band coefficients; and wherein the restored picture is obtained by inverse sub-band transforming respectively restored sub-band coefficients obtained by adding the predicted sub-band coefficient and a decoded differential sub-band coefficient generated by decoding said encoded sub-band coefficient.

* * * * *